United States Patent
Olivier

(10) Patent No.: US 6,480,885 B1
(45) Date of Patent: Nov. 12, 2002

(54) DYNAMICALLY MATCHING USERS FOR GROUP COMMUNICATIONS BASED ON A THRESHOLD DEGREE OF MATCHING OF SENDER AND RECIPIENT PREDETERMINED ACCEPTANCE CRITERIA

(76) Inventor: Michael Olivier, 2517 Nedson Ct., Suite 200, Mountain View, CA (US) 94043

( * ) Notice: Subject to any disclaimer, the term of this patent is extended or adjusted under 35 U.S.C. 154(b) by 0 days.

(21) Appl. No.: 09/557,681

(22) Filed: Apr. 25, 2000

Related U.S. Application Data

(63) Continuation-in-part of application No. PCT/US99/21589, filed on Sep. 15, 1999.
(60) Provisional application No. 60/100,387, filed on Sep. 15, 1998, provisional application No. 60/115,566, filed on Jan. 12, 1999, and provisional application No. 60/143,947, filed on Jul. 15, 1999.

(51) Int. Cl.[7] .............................................. G06F 15/16
(52) U.S. Cl. ........................ 709/207; 709/106; 709/202
(58) Field of Search ................................ 709/106, 202, 709/207

(56) References Cited

U.S. PATENT DOCUMENTS

| | | | |
|---|---|---|---|
| 5,513,126 A | 4/1996 | Harkins et al. | |
| 5,555,426 A | 9/1996 | Johnson et al. | |
| 5,694,616 A | 12/1997 | Johnson et al. | |
| 5,796,393 A | 8/1998 | Macnaughton et al. | |
| 5,819,261 A | * 10/1998 | Takahashi et al. | |
| 5,864,684 A | 1/1999 | Nielsen | |
| 5,909,679 A | 6/1999 | Hall | |
| 5,923,845 A | 7/1999 | Kamiya et al. | |
| 5,959,693 A | 9/1999 | Geerings | |
| 5,999,932 A | 12/1999 | Paul | |
| 6,012,090 A | * 1/2000 | Chung et al. | |
| 6,047,310 A | * 4/2000 | Kamakura et al. | |

* cited by examiner

Primary Examiner—Le Hien Luu
Assistant Examiner—Stephen Willett
(74) Attorney, Agent, or Firm—Oppenheimer, Wolff & Donnelly LLP; Claude A. S. Hamrick

(57) ABSTRACT

A method for enabling users to exchange group electronic mail by establishing individual profiles and criteria, for determining personalized subsets within a group. Users establish subscriptions to an electronic mailing list by specifying user profile data and acceptance criteria data to screen other users. When a user subscribes, a web server establishes and stores an individualized recipient list including each matching subscriber and their degree of one-way or mutual match with the user. When the user then sends a message to the mailing list, an email server retrieves 100% her matches and then optionally filters her recipient list down to a message distribution list using each recipient's message criteria. The message is then distributed to matching users. Additionally, email archives and information contributions from users are stored in a database. A web server creates an individualized set of web pages for a user from the database, containing contributions only from users in his recipient list. In other embodiments, users apply one-way or mutual criteria matching and message profile criteria to other group forums, such as web-based discussion boards, chat, online clubs, USENET newsgroups, voicemail, instant messaging, web browsing side channel communities, and online gaming rendezvous.

22 Claims, 15 Drawing Sheets

TO: NEIGHBORS@LOCAL2ME.COM
FROM: YGREENEST@LOCAL2ME.COM (YOLANDA GREENEST)
SUBJECT: FINDING A GOOD REMODELLING CONTRACTOR
DATE: MAY 12, 1998

HI ALL,

LOOKING FOR A GREAT REMODELLER TO HELP US REDO OUR KITCHEN. DOES ANYONE HAVE A RECOMMENDATION?

THANKS!
--Y

504⤴

TO: NEIGHBORS@LOCAL2ME.COM
FROM: WHOEVER@SOMEWHERE.COM (W. HOEVER)
SUBJECT: RE: FINDING A GOOD REMODELLING CONTRACTOR
DATE: MAY 12, 1998

I REALLY LIKE FRANK VARNEY. HE'S AN EICHLER SPECIALIST AND DID A GREAT JOB ON A BIG REMODEL FOR US. WE HAD CHECKED HIS REFS BEFOREHAND AND HEARD FROM SEVERAL OTHER VERY SATISFIED CUSTOMERS.

-- WILL

YOLANDA GREENEST WROTE:
> HI ALL,
>
> LOOKING FOR A GREAT REMODELLER TO HELP US REDO
> OUR KITCHEN. DOES ANYONE HAVE A RECOMMENDATION?
>
> THANKS!
> --Y

522

TO: NEIGHBORS@LOCAL2ME.COM
FROM: KELLY@HOTMAIL.COM (KELLY G.)
SUBJECT: SINGING?
DATE: MARCH 30, 1998

524

(#PROFILE#
  ZIP=94101-2371
  GENDER=FEMALE
  AGE=23
)
(#CRITERIA#
  DISTANCE=5 MILES
  GENDER=ANY
  AGE=20-50
)

526

WANT TO SING WITH OTHER FOLKS IN THE NEIGHBORHOOD?
WE'RE MEETING AT THE LITTLE PARK ON SATURDAY AT 10AM.
RSVP TO ME AND JOIN US!

--KELLY
 555-8484

FIG. 9

DYNAMICALLY MATCHING USERS FOR GROUP COMMUNICATIONS BASED ON A THRESHOLD DEGREE OF MATCHING OF SENDER AND RECIPIENT PREDETERMINED ACCEPTANCE CRITERIA

REFERENCE TO RELATED APPLICATIONS

This application is a Continuation-in Part of PCT/US99/21589 filed Sep. 15, 1999 which claims priority to provisional patent application Ser. No. 60/100,387, filing date Sep. 15, 1998, entitled "Electronic Match-Making Within A Group Using Criteria." This application also claims priority to provisional patent application Ser. No. 60/115,566, filing-date Jan. 12, 1999, entitled "Dynamic Matching™ of Users For Group Communication" and provisional patent application Ser. No. 60/143,947, filing date Jul. 15, 1999, entitled "Dynamic Matching™ of Users For Group Communication."

BACKGROUND OF THE INVENTION

1. Field of Invention

This invention relates to electronic communication within group forums, specifically a process for dynamically matching users for high quality interactions within a group forum by establishing individual user profile data and acceptance criteria data for restricting interaction.

2. Discussion of Prior Art

There are many systems that allow users and groups of users to interact with each other. Electronic forums such as electronic mail, voicemail, USENET newsgroups, web-based discussion boards, and online multi-player gaming services all have such facilities. But none of the systems gives users individualized acceptance criteria parameters for locating high quality matches with other users. Each forum is created with a particular subject or objective in mind, and beyond that all users must follow the boundaries of that forum. It is strictly a "take it or leave it" proposition to the user. There is little opportunity for a user to personalize the forum to meet his own needs.

With electronic mail, users must know the email addresses of those they want to contact. Electronic mailing lists improved on this for group communication by redistributing each message sent to the list's email address out to all subscribers. All users get all messages sent to the list. But there are problems—smaller mailing lists are hard to promote and popularize while larger lists are unwieldy, tending to have many rules of use and/or a high message volume, and a high intimidation factor. In short, users have no control over which users on a list they communicate with. An additional problem is not knowing how much email a subscription will deliver to you. One subscription may bring only a few messages per month while another one fills a user's mailbox with 50 or more messages in a single day.

One common yet inflexible division within a topic is by geographic region. Consider a hypothetical worldwide "jazz" mailing list: If a subscriber wants only to communicate about jazz with people in New York City, he must create a separate mailing list, such as "nyc-jazz". For most users, the work involved in creating and managing a list is prohibitive. Some regional groups may develop their own jazz mailing lists, but such lists are usually tough to advertise and promote. Regional lists are inflexible because they have pre-set borders, e.g., the borders of New York City. That list will not meet the needs of users just outside city limits who may have a lot in common with those near them just inside city limits, but little in common with those across town. Each user's needs are different and yet the current mailing list systems are inflexible in allowing users to express their needs and wants via customization.

Similarly, there is much work involved in forming a neighborhood mailing list. If someone in a particular neighborhood wants to communicate with neighbors, there are many steps he must take. First he must create a mailing list. Then he may determine the borders of the neighborhood. This is problematic if it is unclear where the borders should be, as is the case with many unnamed neighborhoods. And then he may advertise and evangelize the mailing list to build subscribership. Since most neighborhoods do not have any channel for information distribution (such as a printed newsletter), this is a daunting task.

To extend the example, different people have different wants and needs even within geographically regional communication. In FIG. 1, one person (A) may want to exchange email with others within a one-mile radius of him. A second person (B) may only want to exchange email with those/on his block. A third person (C) may want only to exchange email with folks in one direction from his house. However, there is currently no way for users to express these desires to control heir participation in a mailing list.

There are countless meaningful acceptance criteria that would benefit users. Consider a parenting mailing list. In general, once a mailing list is formed, it tends to develop its own scope of interest. In this example, the parenting list may develop a very strong trend of discussing infants and toddlers. This can be very limiting for a subscriber who wants to discuss teenagers. That subscriber must delete many unwanted messages and may simply unsubscribe from the list in frustration. She may consider a search for a better list, or she may consider starting a separate mailing list for parents of teenagers, but again the barrier to entry is high. Since the mailing list system cannot leverage information about the ages of children each subscriber is interested in, it cannot deliver to her just those messages about teenagers.

In online gaming, such as "Yahoo! Games", users are able to rendezvous with other users to play multi-player games, such as the card game "hearts". The service provider will often divide the players into several forums based on ability, such as beginner, intermediate, and advanced. But it does, not allow users to specify other acceptance criteria data, such as personality, computer speed, or amount of "chat-style" conversation they want to engage in during a game. Thus users must either live with low quality matches or resort to trial and error, quitting games in the middle, in a search for the characteristics they want in the game. Again the user's only choice is "take it or leave it."

A number of email based news and information services such as InfoBeat provide customized messages to their subscribers, but the messages are only sent by the service itself, not by other users. It is meant for automated information delivery, not interpersonal communication and interaction.

Dating services and employee-employer matching services use criteria and profile information to match people together, but they use those results only for one-on-one communication. hey have not used matching technology for group communication in which each user has their own personalized group.

Although the discussion here has been principally of the interaction provided by electronic mailing lists, other group forums such as USENET newsgroups, web-based discussion message boards. ah online gaming rendezvous are alternatives that exhibit similar problems.

Thus, a method is needed for creating high quality interactions within electronic forms.

SUMMARY OF THE INVENTION

Briefly, a presently preferred embodiment of the present invention is directed to a method for users to exchange group electronic mail by establishing individual profiles and criteria for determining personalized subsets within a group. Users establish subscriptions to an electronic mailing list by specifying user profile data and acceptance criteria data to screen other users. When a user subscribes, a web server establishes and stores an individualized recipient list including each matching subscriber and their degree of one-way or mutual match with the user.

When the user then 'sends a message to the mailing list, an email server retrieves her 100% matches and then optionally filters her recipient list down to a message distribution list using each recipient's message criteria. The message is then distributed to matching users.

Additionally, email archives and information contributions from users are stored in a database. A web server creates an individualized set of web pages for a user from the database, containing contributions only from users in his recipient list. In other embodiments, users apply one-way or mutual criteria matching and message profile criteria to other group forums, such as web-based discussion boards, chat, online clubs, USENET newsgroups, voicemail, instant messaging, web browsing side channel communities, and online gaming rendezvous.

OBJECTS AND ADVANTAGES

Accordingly, several objects and advantages of the present invention are:

(a) Creates personalized, tunable groups for users, using user profile data and acceptance criteria data they specify. This fundamental novelty greatly empowers and enriches the quality of their communications.

(b) Greatly reduces the quantity of electronic forums such as electronic mailing lists, by making possible a small number very broad forums within which users can create their own niches. For instance, a single jazz mailing list can serve the entire world.

(c) Allows users to very easily create discussion niches of meaning to them. They may want to only email with other senior citizens, or only with those in their city. In the parenting example given earlier, each user could specify the children's age range they would like to discuss. The resulting mailing list is tuned to each user's needs, and gives them a much higher quality of interpersonal contact.

(d) Provides a way for meaningful groups to form automatically, such as neighborhoods.

(e) Provides a way of filtering archived information provided by subscribers into individualized archives. This includes email archives as well as other information such as recommended businesses and web sites.

Additional objects and advantages are to benefit society by creating and uniting a huge number of niche groups, and to meet a compelling and immediate user need to customize email list communications according to individual profiles. By dynamically matching each user's profile data and acceptance criteria data to others, the system creates a customized group for each user, enabling groups to form automatically.

Users need a fluid, flexible, and expressive means of controlling their interactions with others. They need to be able to drastically increase the quality of communication, while controlling the quantity of it. This invention enables these users to customize their communications and interactions.

Further objects and advantages of my invention will become apparent from a consideration of the drawings and ensuing description.

DESCRIPTION OF DRAWINGS

FIG. 8 is an example of users sending email messages to a mailing list.

FIG. 9 is an example of an unknown user sending an email message to a mailing list, including profile and criteria data.

FIG. 10(2) is a flowchart of the message distribution process to mailing list subscribers.

DESCRIPTION OF PREFERRED EMBODIMENTS OF INVENTION

A presently preferred embodiment of the present invention uses exchange of electronic mail as its medium The detailed description to follow will focus on an electronic mailing list system in which subscribers specify acceptance criteria data for engagement and then benefit from the ensuing interaction. It will be clear to those skilled in the art that there are many alternative electronic forums in which the invention could be applied. These include, but are not limited to, voicemail, instant messaging, videoconferencing, online chat, web-based discussion boards, USENET, newsgroups, online gaming, online gaming rendezvous, and unified messaging.

Although the discussion here focuses on the internet network for its preferred embodiment, obviously any automated means for group communication may be used for the present invention.

Figure 1:
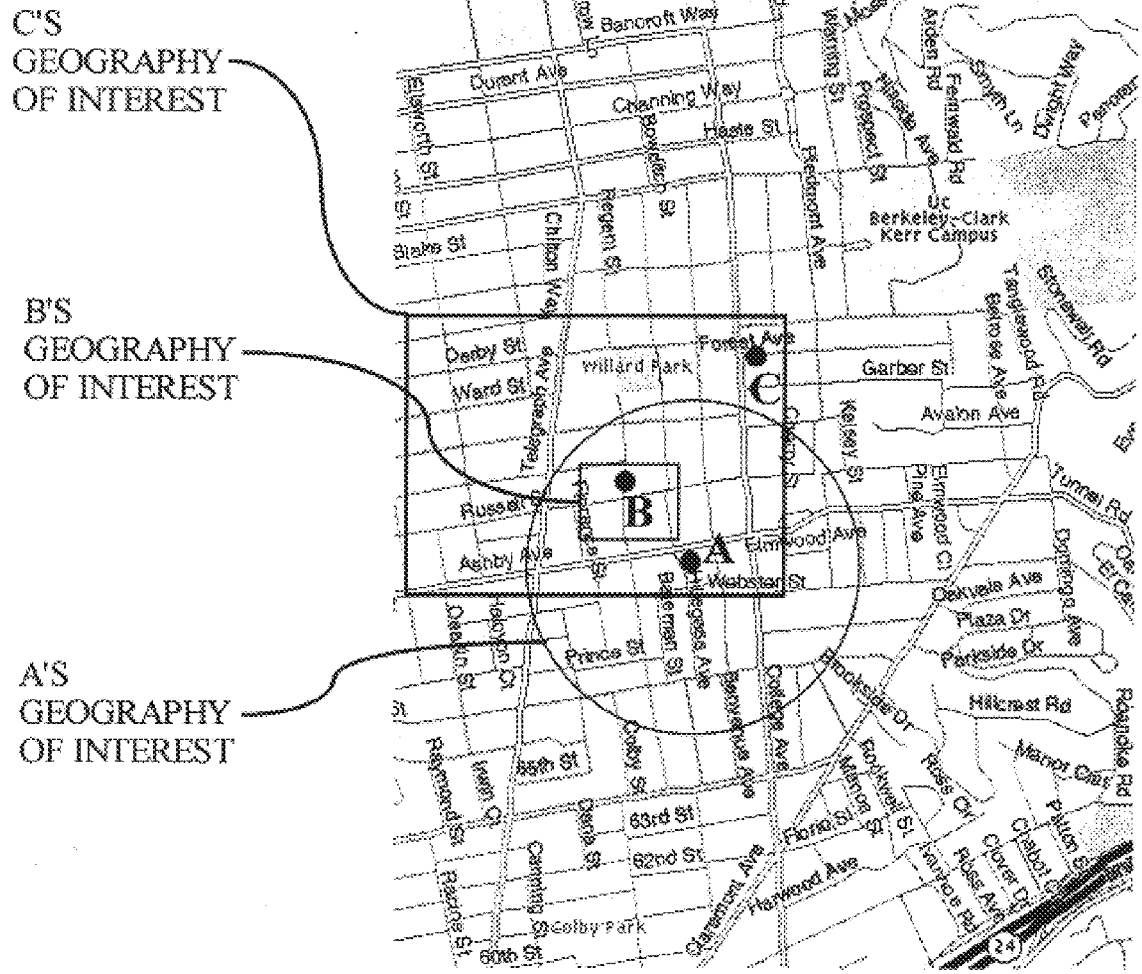
FIG. 1 is an example of neighborhood residents with different geographies of interest.
Figure 2:
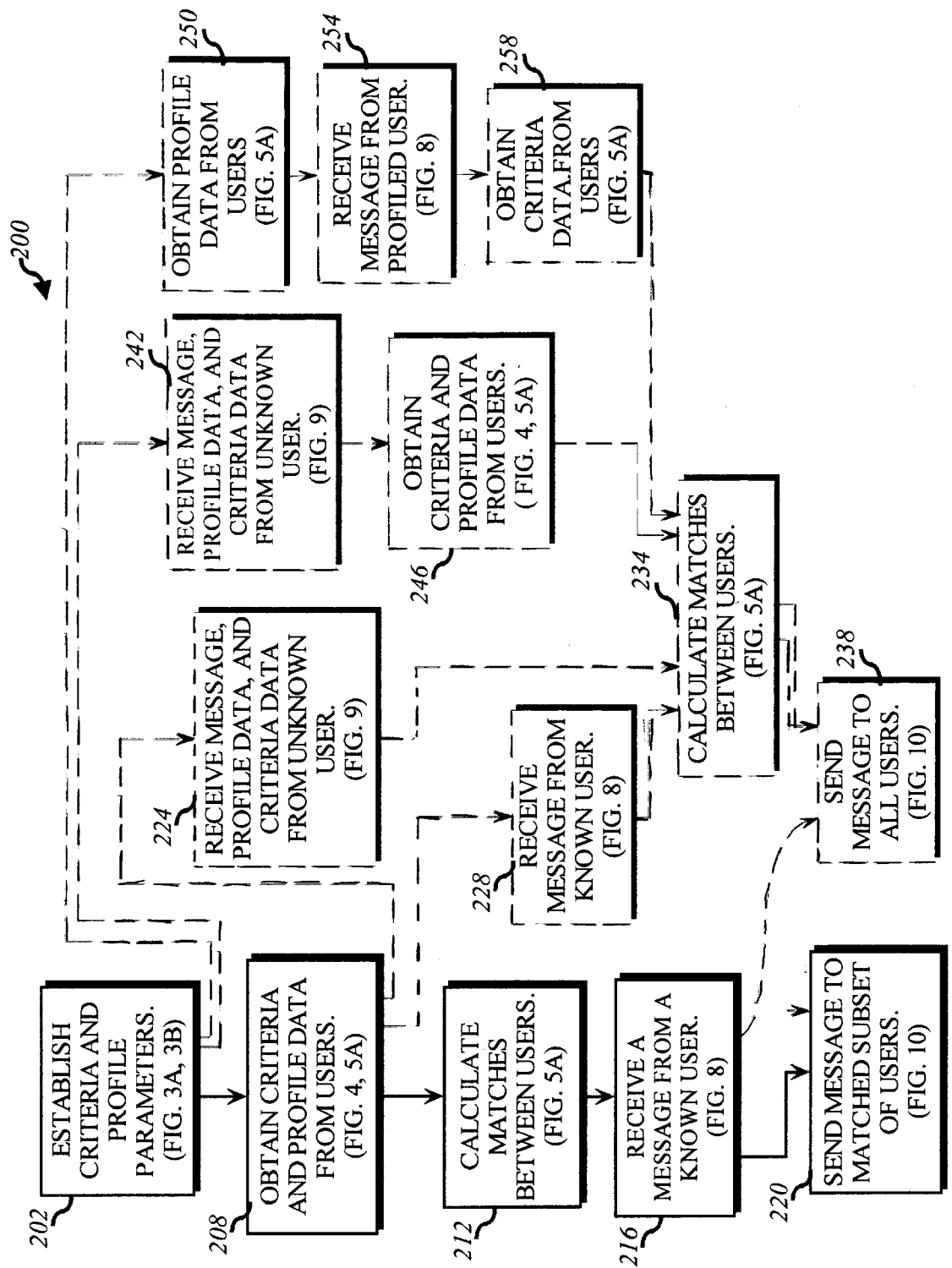
FIG. 2 is an overview of use of the present invention.

Overview of Use:

Referring to FIG. 2, the numeral 200 generally refers to an overview of the use of the present invention. In block 202, a service provider using the invention initializes the system for the first time. The service provider initializes a database, or a dedicated part of a database, on a database server available to both an email server and a web server. This is done using a database system, including a schema, data, and a Database Management System (DBMS). The database system is a product such as those from Oracle or Sybase. The service provider sets up the email server to receive and send email on the internet. They also set up the web server to allow subscribers access to the web site via the internet. The database server, email server, and web server each contain a portion of the present invention. In the preferred embodiment the servers are separate, but alternatively their functions could be combined into fewer servers or expanded to more servers.

The service provider then creates one or more electronic mailing lists by adding mailing list records and related records to tables in the database. This is accomplished using a method provided by the database system. The service provider also establishes acceptance criteria data parameters and user profile data parameters for each mailing list which describe what acceptance criteria data and user profile data is to be collected from the users.

At block 208, a user visits the web site and subscribes to a mailing list, specifying user profile data and acceptance criteria data that control with whom and about what topics they wish to interact. The system stores this and other subscription information in the database. At block 212, one or more servers calculate the degree of matches between the user and every other user, by doing a one way or two-way match between users, using their user profile data and acceptance criteria data. The results of these match calculations are stored in a database table or other storage.

At block 16 the system receives an email message from a known user addressed to an email address on la server the service provider's server. Note that while in this preferred embodiment we use an email message as the vehicle of a communication, any means of electronic or automated communication may be used in its place. This email address is the address dedicated by the service provider as the email address of the mailing list he subscribed to at block 208. At block 220 the system determines which mailing list subscribers within the list's subscriber base should receive the email message, by finding in the database the results of the match calculations done in block 212. It then distributes the email message across the internet to the matching subscribers.

The end result of the process is that users exchange high quality messages with other matching users, and sub-groups form automatically within the mailing list.

To sum up the functionality, consider the following example. Suppose a user Barry wants to send a message about a problem at his child's school. A school mailing list has been established in advance by a service provider hosting the mailing list. Barry first signs up for the school mailing list, specifying his profile and criteria information, including his location and his geography of interest. The system then calculates matches between Barry and other people already on the mailing list based on their profiles and criteria. Barry then writes an email message and addresses it to the email address for his local school mailing list, at the service provider's email server, school@local2me.com. The email server receives the message and retrieves Barry's Match calculations from the database. This describes the other subscribers he is matched with. His message is then sent out to users with whom Barry forms a 100% match, resulting in a satisfying interaction with a subset of users—all the right people.

The remainder of FIG. 2 details several alternative embodiments of the invention that we will now describe.

In an alternative embodiment, block 220 is replaced with block 238. The message is distributed to all users who are subscribers of the mailing list, and each message indicates the degree of match between the sender and receiver.

In yet another alternative embodiment, the message is received from a known user before the match calculation is done. In this embodiment, blocks 228 and 234 replace blocks 212 and 216. In step 228 the system receives a message from a known user. Then in block 234 it calculates the matches between users, and uses those results in blocks 220 and 238 in the manner previously discussed.

In still another alternative embodiment, the message received is from an unknown user, and contains user profile data and acceptance criteria data encoded within the message. Blocks 224 and 234 replace blocks 212 and 216. At block 224, the system receives a communication from an unknown user, including the message content, user profile data, and acceptance criteria data. Then in block 234 it calculates the matches between users, and uses those results in blocks 220 and 238 in the manner previously discussed.

In another alternative embodiment, the system receives a message from an unknown user before obtaining criteria and profile data from other users. Blocks 242, 246, and 234 replace blocks 208, 212, and 216. At block 242, the system receives a communication from an unknown user, including the message content, user profile data, and acceptance criteria data. In block 246 the system obtains acceptance criteria data and user profile data from a multiplicity of users. Then in block 234 it calculates the matches between users, including the unknown user who sent the message, and uses those results in blocks 220 and 238 in the manner previously discussed.

In another alternative embodiment, the system obtains user profile data first, then receives a message from a profiled user, and then obtains acceptance criteria data before calculating matches and sending the message. Blocks 250, 254, 258, and 234 replace blocks 208, 212, and 216. At block 250, the system obtains user profile data about users via a web form presented to the users, an email message from the users, an inference engine, a search engine, or another source. The system stores this and other subscription information in the database. At block 254 the system receives a message from a profiled user, i.e., a user who has a known profile. The user sending the message will either transmit his acceptance criteria data with the message or he will specify it with other profiled users at block 258. At block 258, the system obtains acceptance criteria data about its profiled users by one or more of the methods described for block 250. In block 234 the system then calculates the matches between users, including the profiled user who sent the message, and uses those results in blocks 220 and 238 in the manner previously discussed.

Figure 3A:
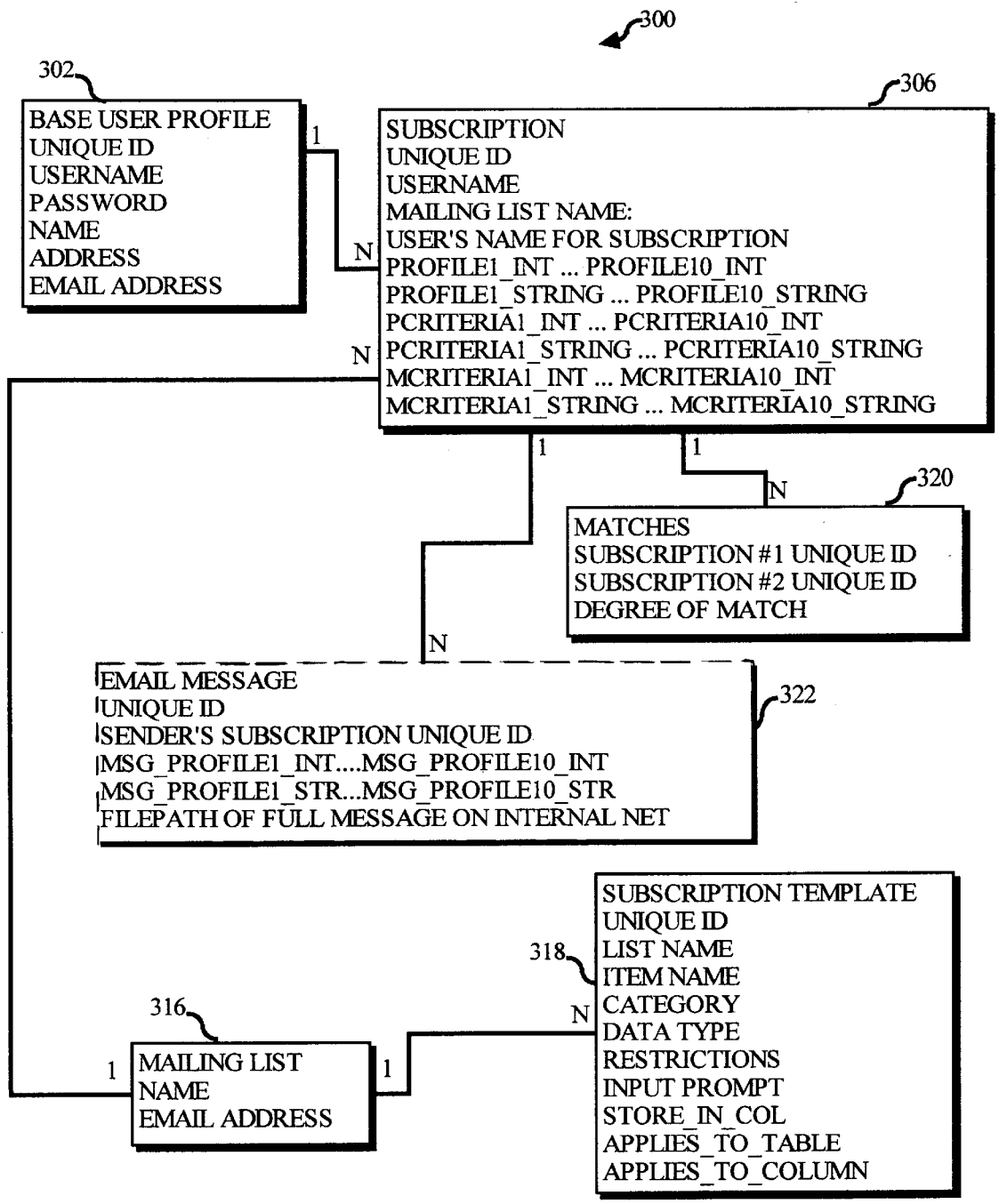
FIG. 3A is an overview of the invention's system's database.

Turning to FIG. 3A, numeral 300 generally refers to a description of the database schema and relationships between entities (Entity/Relationship diagram). The database in this preferred embodiment is a collection of tables of information, as is typically stored in a database product such as Oracle. In the diagram, relationships between tables are shown with '1' or 'n', as will be familiar to those skilled in the art, to indicate the relative number of related records between each pair of tables.

In the description below, we refer to a database record's (or table row's) unique ID. This is also commonly called "Row ID", "Record ID", "Object ID", or "OID" by those skilled in the art, and is simply a unique identifier for each row in a table.

At block 302, the users table (also referred to as the "base user profile table") contains a collection of base user profile data records. These are records that contain base information about a user, such as name and email address, separate from their subscriptions. Each record also contains a unique ID. In this preferred embodiment, there is only one base user profile data record per user.

At block 306 the subscriptions table contains one record for each subscription entered. Each user can have multiple subscription records, for instance subscribed to a jazz mailing list and a neighborhood mailing list. The subscription table contains the unique ID and unique username of the subscribing user. It also contains the name of the mailing list the subscription is for. Another field allows the user to give the subscription a descriptive name. The table also contains subscription user profile data, which is profile information about the given user specific to this subscription. This information is stored in integers and strings—10 of each type of variable are allocated. Similarly, there are data fields for acceptance criteria data ("pcriteria") describing what this user requires of other users, and message acceptance criteria data ("mcriteria") describing what this user requires of messages he receives. Note that we sometimes refer to message acceptance criteria simply as message criteria. The data in each of these profile and acceptance criteria fields varies between mailing lists. The fields can be interpreted by examining the Subscription Template table, discussed below.

The term "user profile" is used here and below to refer to the combination of both a user's base user profile and the subscription user profile. Base user profile data is collected once when the user first registers at the service provider's web site. But the subscription user profile data is extra profile information needed just for a particular mailing list—it is collected when the user subscribes to a particular list. The term "user profile acceptance criteria" refers to acceptance criteria data related to both the base user profile and the subscription user profile.

At block 316 the mailing lists table contains a record for each mailing list in the system. The service provider, using an access method provided by the database system creates these records. Bach record contains a user-presentable name and an email address for the mailing list.

Block 318 refers to the Subscription Template table. This table defines the user profile data parameters and acceptance criteria data parameters that describe the user profile data and acceptance criteria data needed from each user for each mailing list. These parameters act as templates for data to later be obtained and associated with users. This table also describes where the user profile data and acceptance criteria data are stored in the subscription table, and what user profile data each acceptance criterion refers to. Each row correlates to one piece of user profile data or acceptance criteria data. A unique ID is available for each record. List name is the name of the mailing list. Item name is the name of the item. Category describes the type of template this is: user profile, user profile acceptance criteria, message profile, or message profile acceptance criteria. Data type describes the type of data being collected. The restrictions field describes any restrictions for data entry (e.g., a number between 1 and 10). Prompt is a text string to use when collecting user profile data or acceptance criteria data from the user. $Store_{13}in_{13}col$ describes what column in the subscription table provides storage for this data when collected from the user. $Store_{13}in_{13}col$ also describes what column in the email messages table provides storage for this data when an email message is stored. $Applies_{13}to_{13}$table and $Applies_{13}to_{13}$column are only used for acceptance criteria entries in the table. (Not used for user profile entries.) They describe what user profile data the acceptance criteria data applies to. $Applies_{13}to_{13}$table selects the database table of the profile data that the criteria applies to. This could be either the subscription table, the user table, or the email message table. $Applies_{13}to_{13}$column identifies the column of interest within that table.

User profile data and acceptance criteria data are closely related. The system compares acceptance criteria data to user profile data to determine subscriber and message matches. A piece of profile data may describe a single data point, such as geographical location, age, or occupation. The corresponding piece of acceptance criteria data may be a range of such data points, such as a geographical area, age range, or set of selected occupations.

At block 320, the Matches Table keeps track of which subscriptions are matched to each other. The matches table is used so that the time-consuming matching calculation can be done only when needed, with the results stored in this table for quick access. Each row in the table keeps a relation between two matched subscribers. Two subscription unique ID's are stored in each row. A union of searching each of the two subscription unique ID columns for a given subscription's unique ID yields the full set of matching subscriptions for the given subscription. A third column stores the degree of match between the two subscriptions. In the preferred embodiment, this degree of match calculation is a single number representing 0–100%. However, there are many methods of storing such calculations well known to those skilled in the art.

At block 322, the email archives table is an additional feature to keep an archive of email messages previously processed and distributed by the system. This will be used to give users an estimate of email traffic when they are about to finalize a subscription process, and to allow users to browse the archives via a web interface. A unique ID is available for each record. The sender's subscription unique ID links a message to the sender. $Msg_{13}profile1_{13}int$ to $msg_{13}profile10_{13}int$ and the similar string profile fields store data describing the profile of the message (e.g., topic category is 'recommendations'). These correlate to the message criteria optionally stored in subscription records. The email message content is stored separately in the server's filesystem and its filepath is stored in the DB record.

Figure 3B:
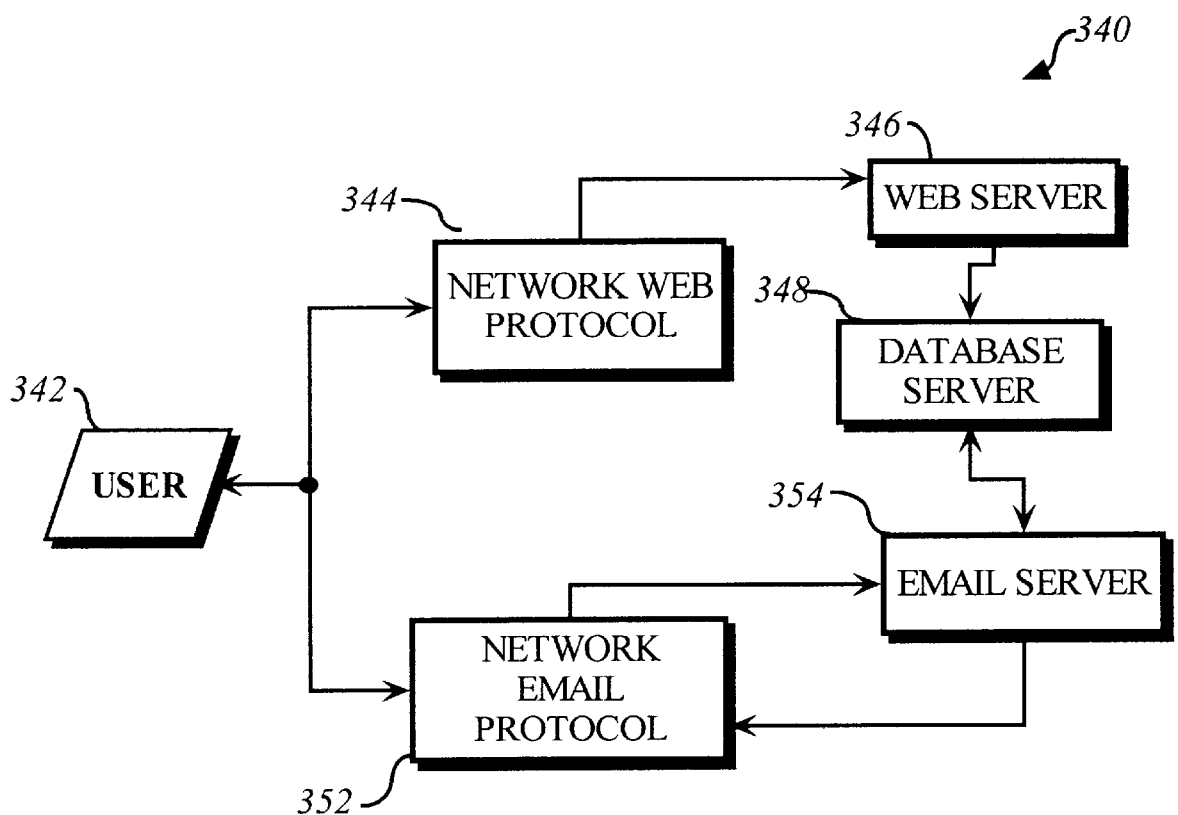
FIG. 3B describes the data flow to and from the system servers.

Turning to FIG. 3B, the numeral 340 generally refers to the flow of data between users, the email & web servers, and the database server. Block 342 represents a user interacting with the system via email and web protocols via a network. At block 344, the users interact via a network web protocol 344 with a web server 346. The web server 346 is software and/or hardware for traditional web serving, plus a portion of the present invention for interacting with users via the web, The web server 346 interacts with a database server 348. At block 352, the users 342 use a network email protocol to interact with an email server 354. Email server 354 is software and hardware for traditional email handling, plus a portion of the present invention for interacting with users via email. The email server 354, like web server 346, has access to database server 348. After processing, email server 354 distributes each message out to via block 352 to multiple users 342. Note that email server 354, web server 346, and database server 348 are three distinct computer systems in this preferred embodiment, but could alternately be combined into fewer computer system or split into more computer systems.

Figure 4:
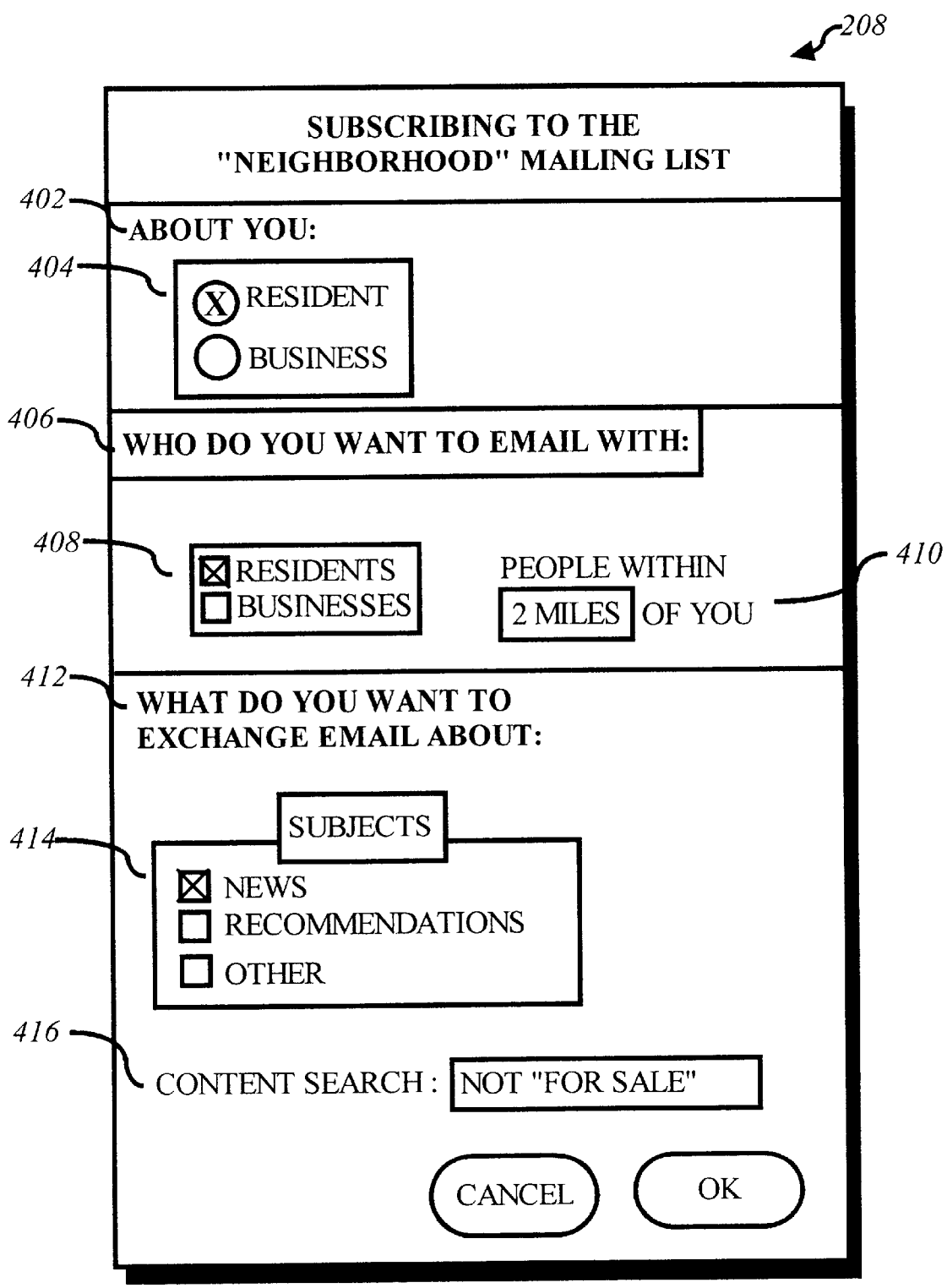
FIG. 4 is an example of a user interface for subscribing to a mailing list.

Referring to FIG. 4, the numeral 208 generally refers to a depiction of an example of a subscription user interface generated by the system and presented to the user as a web page. Numeral 402 denotes a section collecting subscription user profile data. Numeral 406 denotes a section collecting user profile acceptance criteria data. Numeral 408 refers to some subscription user profile acceptance criteria data, to be compared against subscription user profile data. Numeral 410 refers to some base user profile acceptance criteria data, to be compared against base user profile data. Numeral 412 denotes an optional section allowing the user to specify message acceptance criteria data. Subjects 414 and Content Search 416 are two examples of different kinds of message acceptance criteria data that can be compared against the content and profile of an email message.

Figure 5A:
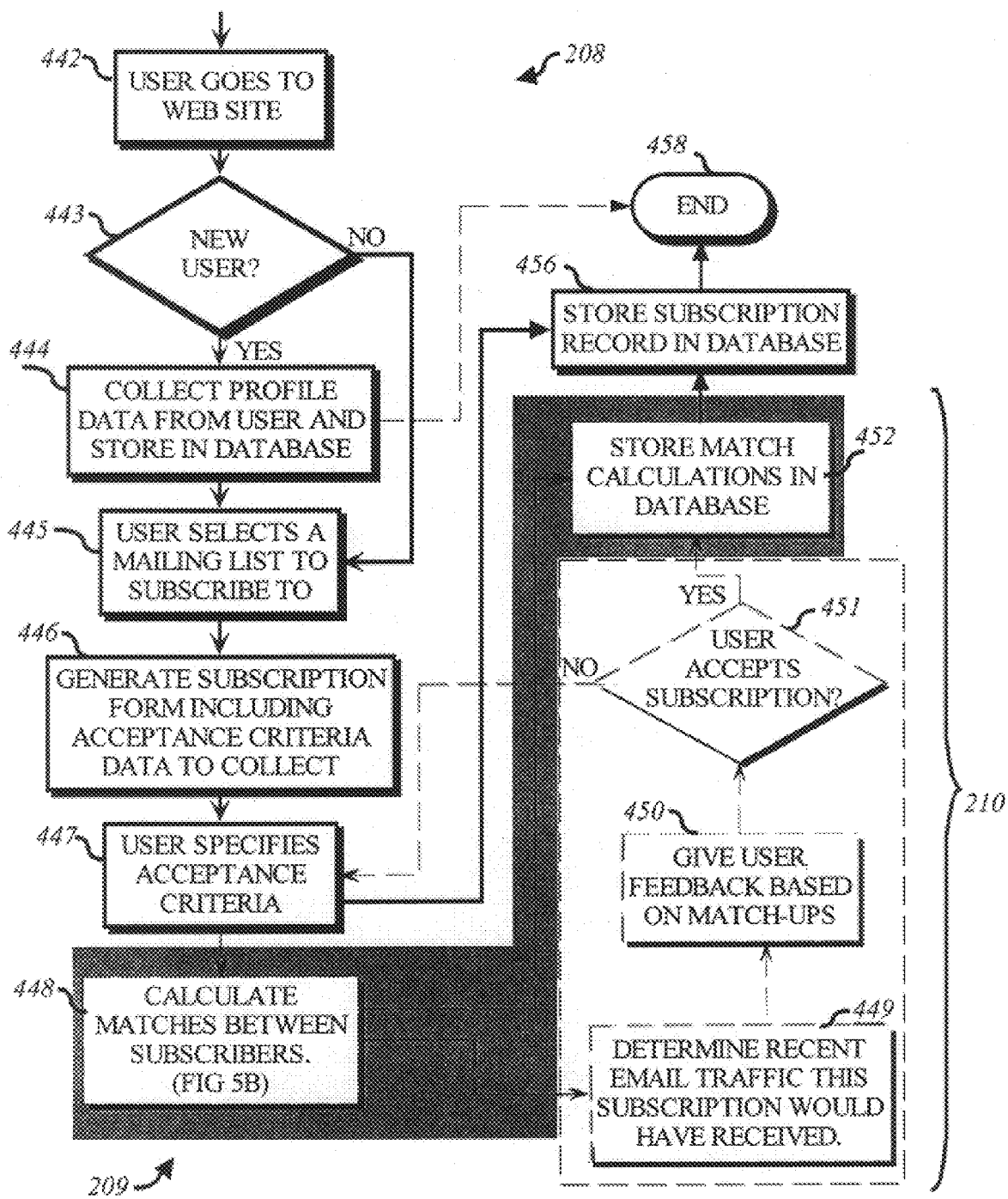
FIG. 5A is a flowchart of the user subscription process.

Referring to FIG. 5A, the numeral 208 generally refers to a process of signing a user up for a particular mailing list with the service provider, specifying user profile acceptance criteria data, and storing the subscription.

At block 442, the user goes to a web site utilizing a portion of this invention. At block 443, the web server ascertains whether the user is known to the service, or a new user. If he is known, processing, moves to block 445. If he is not known, the server proceeds to block 444 and presents the user with a new user registration screen. Upon providing profile data such as name, address, email address, age, and occupation, the server stores the base user profile data record in the database. Processing then continues at block 445. (In an alternative embodiment, instead of continuing to block 445, processing ends immediately at block 458, and the user specifies acceptance criteria at a later time.)

At block 445, the server presents to the user a set of web pages representing a collection of available mailing lists. The user selects a mailing list of interest and indicates via a user interface that he wants to subscribe to it. At block 446, the server retrieves the mailing list record and related template records from the database. It uses these to build a subscription form, and presents it to the user. The form collects acceptance criteria data from the user. It may also collect additional user profile data specifically needed for the mailing list the user is subscribing to, as specified in the template records in the database. At block 447 the user fills out and submits the subscription form.

At block 456 the server stores the subscription record in the database, including the gathered acceptance criteria. Block 458 ends the process. The next phase of the use of the present invention is when subscribers begin sending email messages out to their mailing lists.

As illustrated by the shaded area designated 209, block 448 is an optional step that can be done as each subscription is submitted by a user, or at a later time. Thus it is shown as an optional step. At block 448 the server analyzes all subscription records in the subscription table to calculate the degree of matches between the user profile data of the newly subscribing user and the acceptance criteria of each user already subscribed to this particular mailing list. This is depicted in detail in FIG. 5B and described in detail below.

At block 452 the server stores the subscriber match calculations made in block 448 in the database's matches table. They will be used later to select a subset as the subscriber's personal recipient list for sending out messages, or to indicate to each user with each message the degree of subscriber match between the user and the message sender. Processing then continues at block 456 as described above.

As further illustrated by the bracketed area designated 210, an alternative embodiment allows user feedback and criteria tuning during the subscription process. This embodiment includes that which is enclosed in the dashed box and also the shaded area designated 209 and described above. In this alternative embodiment, after processing at 208 as described above, the system proceeds to block 449, where it determines email traffic this subscription would have received in the recent past and the characteristics the user match calculation has produced. It determines the email traffic by matching the new subscriber's message acceptance criteria data to the email archives table in the database for messages sent by matching users as determined in block 448. The search is further constrained to messages sent to the mailing list of interest. The matching process used is similar to the one that is described in detail below and depicted in FIG. 10. (In an alternative embodiment (not depicted), in block 449 database sampling or a similar technique known to those skilled in the art is used to provide an estimate as feedback.)

At block 450 the system gives the user a web page or other form of feedback about the subscription the user has specified. That information includes number of users exactly matched to the user and an estimate of the average number of messages per day that the subscription will receive. (In an alternative embodiment not depicted, the system may present more detailed feedback to the user about partial as well as exact matches, rather than just 100% matches.) At block 451 the user chooses whether to accept the subscription as specified or further refine or modify it. If the user accepts the subscription, processing continues at 452 as described above. Otherwise processing returns to block 447.

In an alternative embodiment (as suggested in FIG. 2), the user can subscribe to a list dynamically at the time of sending a first message to the list. In that case, the subscription data and possibly the user profile data would be sent via email or other means along with or just ahead of the first message. The subscription feedback steps of the current process (blocks 449–451) are skipped, and the first message is delivered in accordance with FIG. 10 and the related description below. The subscription may either be stored in the database, or if it is a transient subscription ("one-shot thread" subscription), simply associated with the single email message and not stored in the subscription table. In this latter case, replies to this message back to the mailing list would reach the original sender, but other messages to the mailing list would not.

To summarize by way of example, suppose a user decides to try out a mailing list that uses this invention. He signs up at the service provider's web site, selecting a mailing list about the topic of financial investments. He specifies (user profile acceptance criteria data) he would like to interact with other men of age 40–50 who live within three miles of him and do not have children. Using an optional feature, he selects the subtopics (message criteria) related to internet stocks, junk bonds, and international mutual funds. The system responds with a preview of 38 matching subscribers and five messages per week. He wants more people to interact with, so he increases his age criteria to include men between 35–55. He also increases his distance criteria to five miles. Now the system matches him with 68 people and 12 messages per week, and he accepts the setup. The system stores that subscription; soon he will begin interacting with his matched subscribers.

Figure 5B:
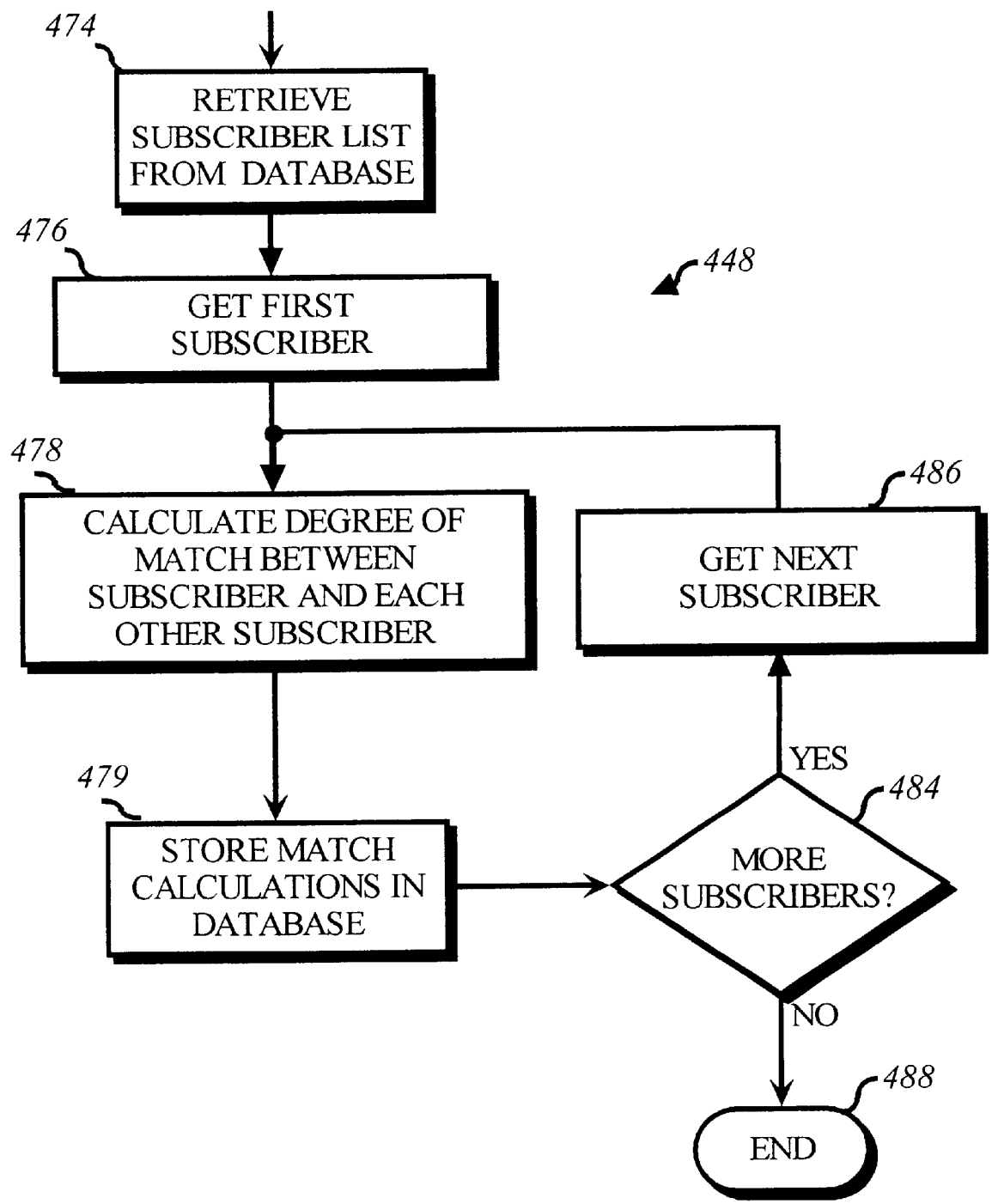
FIG. 5B is a flowchart depicting the process for determining subscriber matches.

Using Acceptance Criteria Data to Determine Subscriber Matches:

Turning now to FIG. 5B, the numeral 448 generally refers to a process of using user-specified acceptance criteria data to calculate subscriber matches. The overall process here is to calculate for each subscriber the degree that his user profile data matches each other subscriber's acceptance criteria data.

At block 474, the server starts by retrieving a subscriber list for the mailing list from a database query. At bock 476 the server gets the first subscriber on the list. At block 478 the server calculates the degree to which the subscriber's user profile data meets each other subscriber's user profile acceptance criteria data. There are a number of methods well known to those skilled in the, art for making such match calculations.

In the preferred embodiment this is not a two-way match. Even if user X does not want to receive message from user Y, user Y may choose to receive messages from user X if all of Y's acceptance criteria data are met. Acceptance criteria data may include a plethora of different choices, including location, age, sex, hobbies, skills, preferences. While U.S. Pat. No. 5,555,426 by Johnson et al describes a method and apparatus for message dissemination that is based on recipient's acceptance criteria data, its intent and focus are on simple topic keywords and sender identities. It did not comprehend the use described here. The scope of the present invention includes much more comprehensive acceptance criteria data with a significantly different intention, result, and benefit for the users, not suggested by the Johnson patent.

(In an alternative embodiment not depicted, a two-way match process is used in which two match calculations are made. A two-way match, sometimes referred to as a mutual match, is when a user X's acceptance criteria data matches a user Y's user profile data, and user Y's acceptance criteria data matches user X's user profile data. In this alternative embodiment, in addition to the match calculation described above, the system also calculates the degree to which each other subscriber's user profile data meets the subscriber's user profile acceptance criteria data. These calculations are combined into one summary calculation, or are stored separately.)

At block 479 the match calculation data, also sometimes referred to as the match score, is stored in the matches table in the database. At block 484, the server tests whether there are more subscribers in the list obtained in block 474. If there are, then at block 486 the server gets the next subscriber and returns to block 478 to continue processing. If there are no more subscribers for whom to do match calculations, processing ends at block 488.

Next we will focus briefly on some details about the use of acceptance criteria data for selecting subscriber matches for interaction within a group.

Generally, this is the process of determining whether a piece of profile data matches a piece of acceptance criteria data. This process is used either for comparing user profile data to user profile acceptance criteria data, or optionally for comparing message profile data to message profile acceptance criteria data. The system calculates a degree of match between two subscribers, based on one subscriber's user profile data matching to the other acceptance criteria data. Alternatively the matching can be calculated as a two-way match, instead of a one-way match, including both users' acceptance criteria against each other's user profile data.

For each acceptance criterion to test, the server determines the profile data field that matches the current acceptance criterion. The field data may be one of a number of different data types, including text strings, numbers, dates, geographical locations, references to entire other acceptance criteria data records, and lists of any of the aforementioned types. The associated acceptance criteria data are generally ranges of field data, e.g., number range acceptance criterion for number profile data, geographical area of interest acceptance criterion for geographical location profile data, etc.

Methods for representing such data types and the type information itself are well known by those skilled in the art.

If an acceptance criterion is a reference to another subscriber's acceptance criteria data, then the entire profile data set becomes the data to be tested against the referenced entire set of acceptance criteria data.

Figure 6:
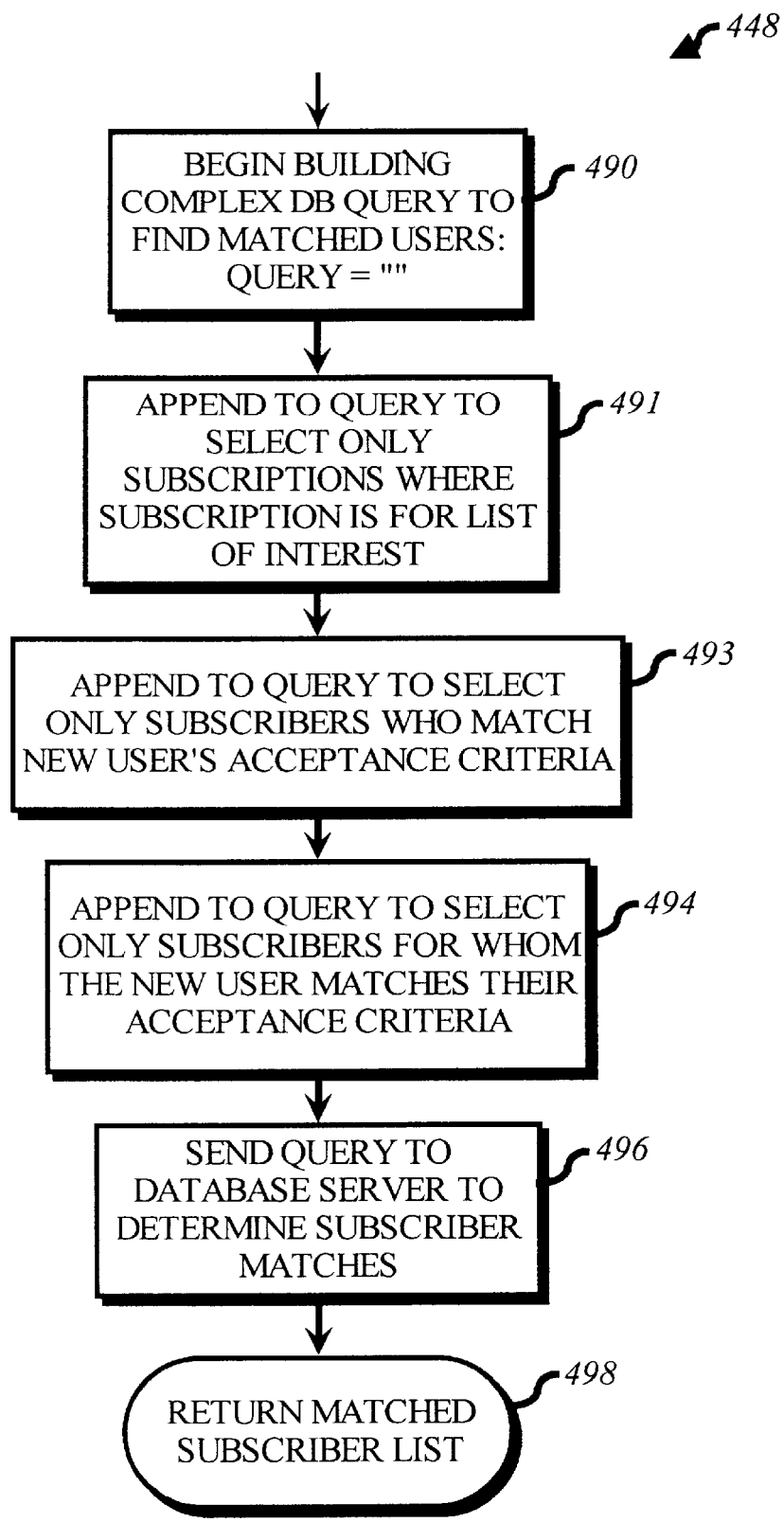
FIG. 6 is an alternative flowchart for determining subscriber matches.

An alternative embodiment to FIG. 5B is depicted in FIG. 6. In this embodiment, an SQL database query approach is taken. Block 448 again generally refers to a process of using user-specified acceptance criteria data to determine subscriber matches. At block 490, the query conditions string is defined to be empty, to begin building a complex query. At block 491, conditions are appended to the query to select only subscriptions from the subscriptions table that are subscriptions for the target mailing list. Block 493 adds the condition that selects subscribers who match the new subscriber's acceptance criteria data. Block 494 adds the condition that selects subscribers who will accept the new subscriber, per the new subscriber's user profile. At block 496, the query is sent to the database server. The result back from the database server is a list of subscribers matching all of the conditions. At block 498 the system returns the matched subscribers to the super-process, completing the task of determining matched subscribers.

Figure 7:
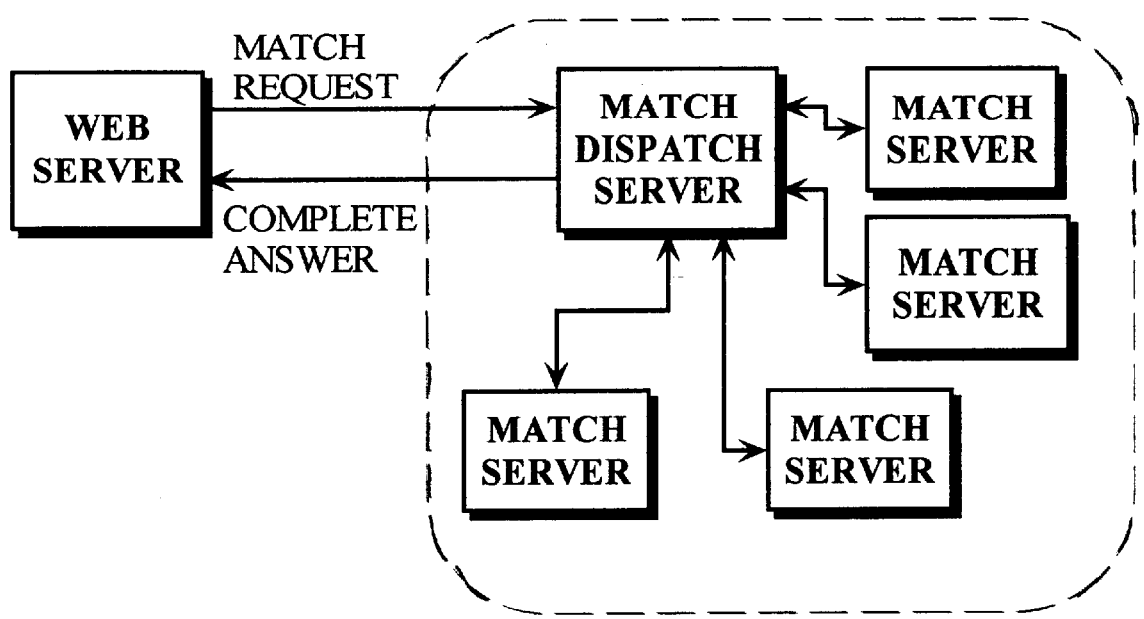
FIG. 7 is another alternative flowchart for determining subscriber matches.

Another alternative embodiment to FIG. 5B is depicted in FIG. 7. In this embodiment, the matching is done through multiple computers operating as a distributed system. All communication between computers is through a standard means such as CORBA. A Match Dispatch Server computer distributes the matching process across a cluster of Match Servers. Each match server handles part of the total number of subscriptions in the system. Each match server keeps its own cached copy of the database data for high-speed access during the matching process. To conduct a match, a client sends a match request to the Match Dispatch Server ("dispatcher"). The dispatcher has a lookup table describing which Match Servers are needed to compute a particular match. The dispatcher returns a list of Match Servers to use in completing a dynamic match. The client then requests those match servers to perform partial matches, and the results are combined for the final answer. The lookup table is centralized on the dispatcher system. Data changes (e.g., from a user tuning his community settings on the web site) will first be stored in an SQL database, and then updates distributed to appropriate server(s). Although FIG. 7 only shows a single dispatcher, multiple redundant dispatchers may be used.

Referring to FIG. 8, the numeral 216 generally refers to an example of subscribers sending messages to the mailing list email address for distribution to other matching subscribers within the list. The service provider previously designated an email address as the mailing list's address, a practice well known by those skilled in the art. Block 502 is an example of a message sent to "neighbors" mailing list, and block 504 is a response from one of the subscribers who received the original message.

Referring to FIG. 9, the numeral 520 generally refers to an alternative embodiment to FIG. 8 in which the system receives a message from an unknown user. Embedded within the ordinary email message is the unknown user's profile and criteria data. Block 522 is the header portion of the email message. Block 524 is the profile and criteria data portion of the message, containing all necessary data for cross-matching the unknown user with the known subscribers. The embedded data could alternatively come via an attachment or other means. Or alternatively the entire communication could be transmitted via another means besides email, such as the HTTP protocol. Block 526 is the body of the message to be distributed.

Figure 10:
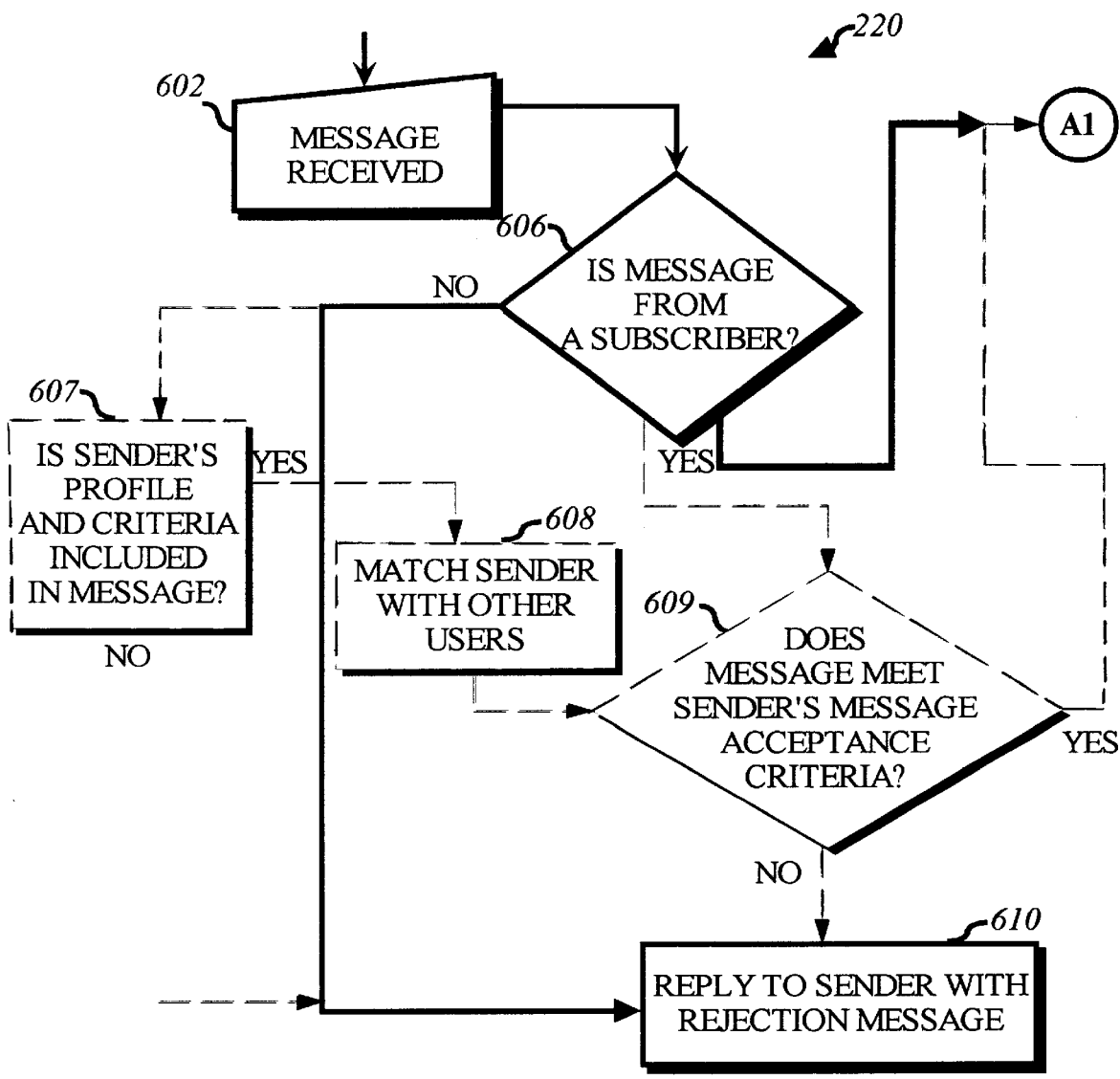
FIG. 10(1) is a flowchart of the message distribution process to mailing list subscribers.
Figure 10:
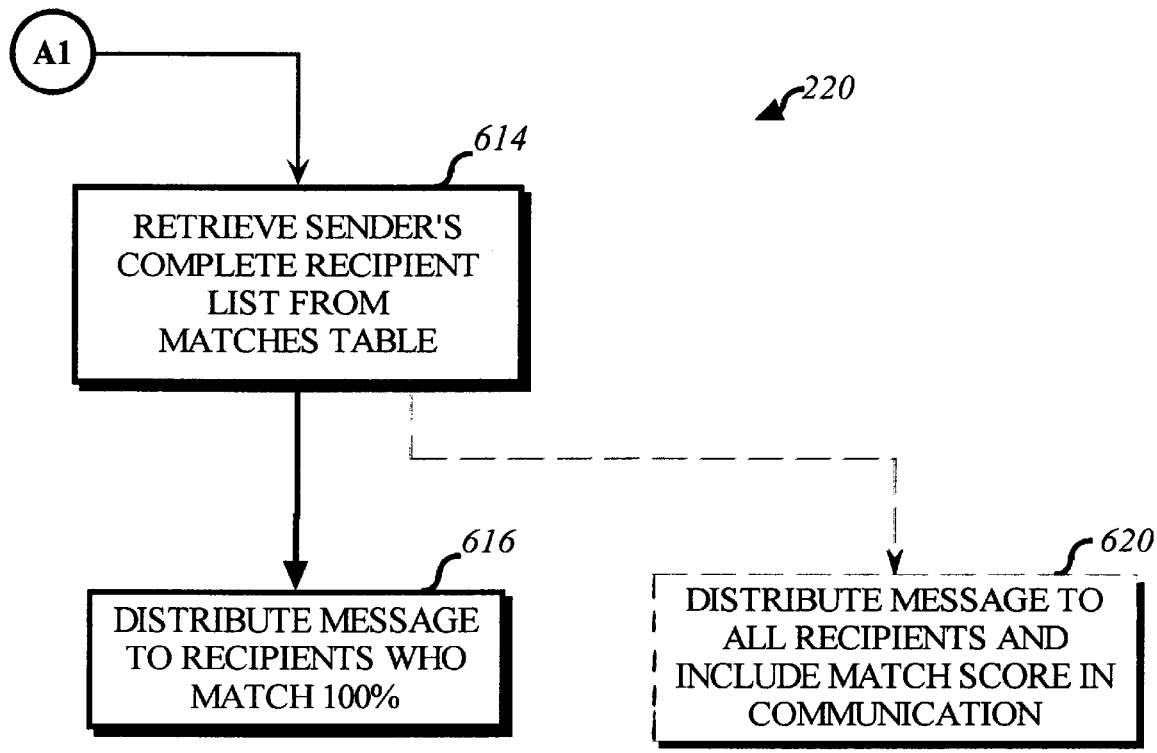

Process of Distributing Electronic Mail Messages:

Referring to FIG. 10, the numeral 220 generally refers to a message distribution process, wherein an email message sent by a subscriber is distributed to a subset of subscribers who match the sending user and his message.

At block 602 the system receives an email message from a known user. We'll call this user "sender". (In an alternative embodiment as suggested by FIG. 2, the message received is from an unknown user.)

In our preferred embodiment, no message profile data is obtained with the message and no matching occurs by message profile and message criteria.

At block 606 the system determines the sender's email address and checks the database or elsewhere to be sure the message is from a subscriber of the specified list. If she is not a subscriber, processing proceeds to block 610 where the message is rejected and a rejection return email is sent to the sender, and processing concludes. If block 606 succeeds, then processing continues at block 614, where the system retrieves the sender's recipient list from the matches table. In block 616 the system finds the subset of the recipients whose match calculation is a 100% match with the sender. (In an alternative embodiment not depicted, an additional next step at this juncture is to reduce the subset by removing recipients whose message criteria isn't met by the sender's message.)

Finally system distributes the message to the final subset of recipients via the internet or by another method of delivery.

In one alternative embodiment (not depicted), the first line of the body or the subject line of the message received at 602 contains keywords in brackets to specify the message's profile data, e.g., "[for sale]" or "[school]".)

In another alternative embodiment (not depicted), the user fills out a form accessed at the service provider's web site or uses an email-based form. The form includes message body and various form controls such as checkboxes for the user to specify the message's profile data (e.g., this message is about subject "for sale"). The system receives the form data at 602 and processes it in a similar manner.

In yet another alternative embodiment as suggested by FIG. 9, if in block 606 the sender is not a subscriber, processing proceeds to block 607 where the system checks whether the sender's profile data and criteria data or just the sender's profile data are included in the body of the message. If the data is not included, processing proceeds to block 610 and continues as described above. If the data is included, processing continues at block 608 where the system matches the user against each other user who is a subscriber to the mailing list. This is done using the same process as previously described for calculating matches between users. Processing then continues at block 609.

In still alternative embodiment, if block 606 succeeds, processing continues at block 609. At block 609, the system tests whether the message meets the sender's message profile acceptance criteria data. This is to make sure that the sender is not distributing a message which she herself would block as an incoming message, based on her message profile acceptance criteria data. An example of when this happens is when the user is not accepting "for sale" topics, but sends out a message with a "for sale" message profile. If the message does not meet the sender's message profile acceptance criteria data, then in block 610 the message is rejected and the process ends. If the message meets the acceptance criteria data, then processing continues at block 614.

In anther alternative embodiment, block 616 is replaced with block 620. In block 620, the message is distributed to all recipients in the sender's recipient list, and each sender receives some indication of the match score or generally the degree of match.

Figure 11:
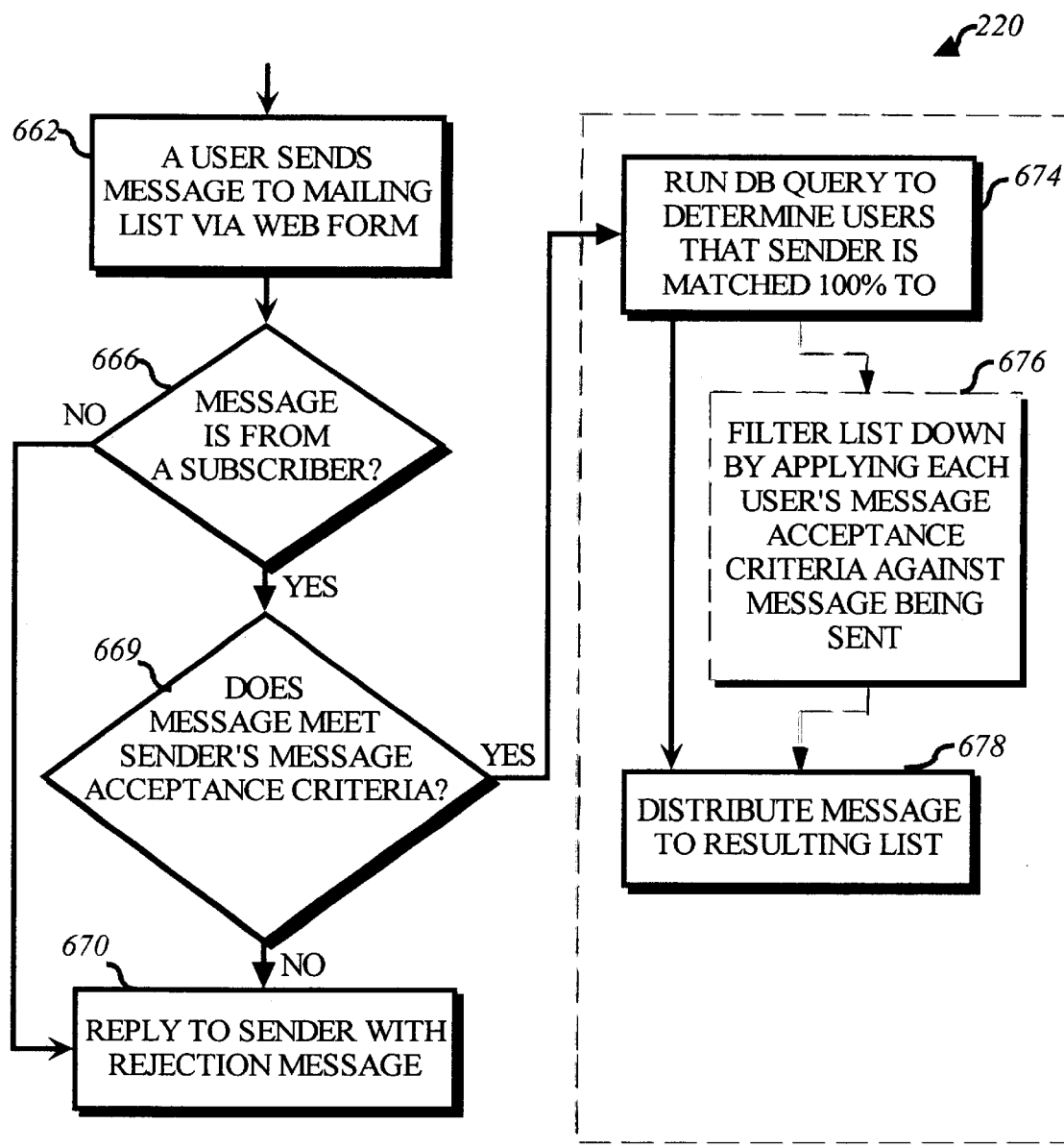
FIG. 11 is an alternative flowchart of the message distribution process to mailing list subscribers.

FIG. 11 depicts an alternative embodiment to that depicted in FIG. 10. In this alternative embodiment, the distinction from FIG. 10 is that which is shown in the dashed box. Blocks 614 and 616 of FIG. 10 are replaced by blocks 674–678 of FIG. 11. Other than that the diagrams and process are identical. In block 674, a database query is performed to determine matched subscribers, rather than using the pre-calculated matched subscribers stored in the matches table. This would be completed in the same way as previously shown in FIG. 5B or FIG. 6 and the accompanying description. (In optional block 676, the resulting list from 674 is pared down by removing subscribers whose message acceptance criteria data indicates they don't want to receive this message.) Finally in block 678 the system distributes the message to the final list of recipients via the internet or by another method of delivery.

Description—Additional Alternative Features

One additional feature would be to allow users the option of specifying a subscription expiration date. The system stores store the expiration date in the subscription field. The system periodically checks the subscriptions table for expired ones. It notifies the user of an expired subscription via email that his subscription has been deleted.

Another feature is to give the subscribing user feedback at subscription time on the identities and/or other info about what subscribers he has been matched up with. This may include email addresses, geographical data such as a graphical map indicating locations of other users.

Another feature is a way for users to be hidden from being revealed to a sender as potential recipients of a message. Some users may desire privacy, and this feature would restrict the processes described herein from revealing that user's identity or other information. The processes are simply, modified to maintain privacy of these users.

Another feature is to allow a user to exclude particular subscribers and subjects from his interactions. Excluding subscribers is similar to chat's "ignore user" feature and is implemented by allowing the user to enter email addresses or user names of users to be ignored. The subscriber matching process described in FIG. 5A, block 448 and FIG. 5B are modified to ignore the specified users. The user can also exclude subjects by entering a search string on the subscription tuning web page. The search may be a simple search or complex search predicate. FIG. 10 block 616 is modified to screen out recipients whose search strings match the message content.

Another feature is for the service provider to be able to exclude certain trouble-maker users or groups of users (e.g., hate groups) from the system.

Another feature is a way for users to volunteer to moderate a discussion. A moderator acts as a human filter for inappropriate messages, scanning for "spam" and other messages that shouldn't be sent to the subscribers. A user can only moderate messages she receives through her subscription and she only moderates messages for users that are on her recipient list. A user volunteers on her subscription tuning web page. If in this preferred embodiment there are more than three active moderators, this user is offered only to be put on a moderator wait list. But if there are less than three moderators, this user is considered. There may then be a process of requesting an email vote of approval from the other subscribers this subscriber interacts with. If a vote is taken, the volunteering is only allowed if that vote comes back substantially positive. Her subscription record is then flagged with a volunteer moderator flag. During message processing, as shown in FIG. 10, moderators within the recipient distribution list are located and one or more of them is emailed a request to approve the message for distribution. The message is stored in a suspended messages table in the database along with its distribution list until an approval or rejection is returned. If the message isn't approved or rejected after 5 days or another period of time, it is removed from the database and returned to the sender. If a moderator approves the message, it is then sent to the distribution list. If it is rejected, the sender is informed via email. In either case the message is then removed from the suspended messages table.

A variation of the above is a feature to allow the user to specify "ignore moderator." This allows the user, if so desired, to receive all messages regardless of the moderator. Another variation is to allow each user to select from one or more available moderators which moderator he wants, if any.

Another feature is to allow the acceptance criteria data to include a complex search predicate, an example of which is "recommend*OR 'for sale' OR (city and police)". Processes for applying such a search predicate are well know by those skilled in the art. This search could be applied to the message subject and/or content, to the user profile, or to the message profile.

Another feature is to allow more advanced geographical location matching against acceptance criteria data. A mapping product or service is used to recognize street addresses and allow users to specify geographical areas, such as zip code, neighborhood name, city, county, state, region, or an outline drawn on a graphic image of a map. Thus a user can specify the exact geographies of interests and the system can match users based on street addresses and geographies. Alternatives to street address data are the use of street intersection, GPS coordinates, longitude and latitude. If the location is not a specific point, but rather an area, a user would be considered to be generally within that area, and would match another user's geography of interest if the two areas intersected.

Another feature is to allow users to maintain the privacy of their geographical locations by using a small geographical area, such as a ½ mile radius around the user's house, in place of an exact location. This reduces the chance of another user being able to pinpoint someone's exact location. The system would allow the user to specify this as part of their base user profile. It would consider the base user profile data to match another user's location acceptance criteria data if the geographies intersected.

Another feature is allowing two or more subscribers of a particular list to form a group, agreeing to share acceptance criteria data as previously discussed. Each member of the group agrees to apply each other member's acceptance criteria data to everyone except that other member, also previously discussed. Any member can form a group by selecting a user interface element on the webpage for their subscription. The system asks them to name their group, and keeps track of a list of group members within the group's record in a group table in the database. The founding subscriber and anyone else he specifies become the controllers of the group. They must approve all new members via an email or web-based approval mechanism. Then as each member is admitted to the group, each of the group members' subscriptions are recalculated as previously discussed, to update all subscribers' recipient lists based on the change to group acceptance criteria data. Note that recipient lists of subscribers not in the group are also affected. Whenever a group member changes his acceptance criteria data, other group members are notified and the group leader(s) must approve the change or expel the changing member from the group. The group will still interact with users outside the group, but only with users that form a mutual acceptance criteria data match with the compound group acceptance criteria data. Alternatively, the group can simply lock out all non-members from all communication.

Another feature is to allow acceptance criteria data sets outside the scope of a particular subscriber to be used optionally by each subscriber or enforced upon all subscribers. The service provider could set up acceptance criteria data that is associated with an entire mailing list, that specifies that all users must be inside the United States for the list. Or a member or the service provider may specify an acceptance criteria data parameter that when applied rids the system of certain kinds of unwanted commercial email. In either of these cases, or any other similar case, the system allows acceptance criteria data to be named and stored in the database, and for any user to add that acceptance criteria data by reference into their own acceptance criteria data for a subscription.

Another feature is to have the email delivery process control the delivery of reply email messages in a different manner. Replies to an email message go to the distribution list of the original message, rather than the replying subscriber's distribution list. This keeps a discussion with the same group of users, with the potential down-side of some users interacting with each other who don't usually interact. The system stores the email message in the email archive table. It then stores in the database a relationship between the email message sent and the distribution list the message was sent to. The unique ID of the email message's database record is then encoded in the "To" header field of the email message, e.g., "To: neighbors-1354321@local2me.com". When someone responds to the message via their email client's reply all feature, the message is addressed back to that To header field, including the encoded unique ID. When the message arrives at the server, the message is recognized as a reply to an original posting, and the unique ID is extracted from the email address (1354321 in the above example). It then uses the stored distribution list associated with the unique ID, rather than the sender's distribution list, for distribution. The step of checking each recipient's message acceptance criteria data is skipped because the stored distribution list has already done that. The message is then sent to the distribution list. An alternative approach is to have the reply go to the replying subscriber's distribution list, but add some text at the bottom of the message for anyone getting the reply who did not receive the original message it was a reply to. That additional text would be a link to a web page showing the archives of the referenced email message(s).

Another additional feature allows a user to override subscription settings when sending a message. The subscription settings are treated as "default settings", and the user can override any of the settings when sending a message. The user could specify this through additional codes in his email message body, or by using a web form when sending the message. The web form would include access to override those settings. The subscription matching process described in FIG. 5B and its related text are used to determine the distribution list for the present message being sent. The settings are not stored as the user's permanent settings. An example use is in a neighborhood mailing list for a user to send out a "for sale" message to neighbors within 10 miles of him, overriding his usual acceptance criteria data of neighbors within 3 miles of him. This feature would have to exist in conjunction with the previous feature, controlling delivery of reply email messages, so that recipients can answer to the same group.

Another additional feature is to allow each list to require approval for subscription. When a user subscribes, another special "approval user" approves or rejects the subscription. This could either be for the whole list, or for a given sub-group within the list as defined by acceptance criteria data. An example is a professional sub-group of a jazz mailing list. Subscribers checking the "Professional" experience checkbox would need to be approved before admittance. In this case, the subscriber is told that his subscription will need to be approved, and his subscription record is stored in a pending subscriptions table. The approval user is emailed with a request for approval. If the approval does not take place within 14 days, the subscriber is automatically rejected by the system.

Another additional feature is to install a process near the beginning of the email distribution process for eliminating unwanted commercial email ("spam"). Such systems are commercially available and are configured independently of this invention. The email server process would allow the service provider to configure it to incorporate a spam elimination process at the appropriate step in the process.

Another additional feature is to offer users a written language preference and translation between languages within a list. A user specifies the language of choice as part of the subscription process. At email distribution time, the email server uses an external language translation process to determine the message's language. For each user whose language preference doesn't match that language, the message is translated before being sent. The translations are grouped so that a translation into a given language happens only once per message. A link to the original message enables review and possible other translations, to account for occasional poor translations.

Another additional feature is for the email server to add an additional text message to each outgoing message. This could be an advertisement or appropriate link to web site content, as determined by the service provider. The system associates header and footer text with the mailing list in the database. The service provider manages that data manually through the database vendor's manual database access interface. The email server grabs that information from the mailing list database entry at the time of message distribution and modifies the message content appropriate Alternatively, the additional text feature may be expanded to allow for distributing different additional text to different sets of users, such as targeted ad insertion. The system associates a number of acceptance criteria data sets described by the service provider with a number of additional text messages. It applies the acceptance criteria data sets one by one to a copy of the distribution list, matching users to the additional text criteria. As each user is matched, the additional text is added to his message and the user is removed from the copy of the distribution list. The last acceptance criteria data set is defined to be a null set, with all remaining users receiving the last additional text message associated with that last null acceptance criteria data set. Thus each user receives only a single additional text message.

Another additional feature allows a user to set up an email alias preference as part of his base user profile. Then each message sent by the user to any mailing list is automatically modified to reflect his email alias rather than the original email address listed in his message. The system also shows this alias instead of his email address at any time his email address would be shown to a user at the web site.

Another additional feature is for the system to determine a user's distribution size threshold based on the user's expertise level. This would warn, for instance, a novice user before sending an email message that would reach more than 200 recipients. The user is asked during registration to rate their computer experience level, and that experience level is matched to thresholds over which the user is warned. During message distribution, the user's threshold is checked for whether there are more recipients on the distribution list than the threshold. If there are, the system informs the user of the size of distribution and asks for confirmation. The system then either distributes, the message or discards it depending on the user's response.

Another additional feature is for the system to verify a user's geographic address when a user subscribes to a mailing list requiring address verification. The mailing list record contains a flag indicating that address verification is required for subscription. When the user subscribes, the system prints a postcard addressed to the user with a special verification code. The system then stores the subscription(s) in a pending subscriptions table in the database. The service provider mails the postcard to the user via the United States Postal Service. Once the user enters the verification code at the web site, the subscription(s) are activated. Alternatively, instead of using a postcard the system allows another subscriber of a given list (e.g., a neighbor) to vouch for the user, for the given list. In that case, the system stores the vouching subscriber's user ID in the subscription record of the new user, and subscribes the new user.

Another additional feature is to show each user individualized web content related to each of his subscription. The web server generates for each user a unique web home page, containing a link for each of his subscriptions. Each of those links leads to a page containing extensive subscriber-created content. The content shown is has been contributed by users matched to the viewing user. In other words, each user only sees subscriber-created content that was created by people he is matched with (and from himself). It displays email archives of messages from the subscribers who match this user's message acceptance criteria data. It also displays other subscriber-created content that matching subscribers have previously contributed to the web site, such as interesting web links, recommendations (such as gardener, electrician, or restaurant), photos, calendar entries, etc. It also displays a way in which this user can add contributions to the site. All content is stored in a user web contribution table in the database. The web site also provides searching of matching subscribers' web sites, from those who have specified a web home page in their base user profile data.

Another additional feature is a periodic process that runs on the database server that performs cleanup operations. It deletes expired subscriptions from subscription table and handles other similar types of cleanup automatically. The system has a parameter that can be set up by the service provider that defines a schedule for performing the database maintenance. It may also transfer messages older than n days to a secondary database server, or move the message bodies to secondary computer systems, to reclaim disk space. In this case, the system must account for this when accessing the email archives.

Another additional feature is to structure the mailing lists into a hierarchy, such that some of the subscription user profile data and acceptance criteria data can be shared between lists. The system can give the user feedback on the number of users who form partial matches with him based on known acceptance criteria data. For instance, many lists will have a geographic distance component. By extracting that as a common setting for all of those lists, a user can specify early on in the subscription process that he wants to interact with people within two miles of him. He can then browse all of the lists that are in that part of the hierarchy, and see the number of users he is matched to in each of the lists. This gives him very helpful feedback on what lists are active in his immediate area. To accomplish this, the system establishes database relationships to keep track of the hierarchy. It also establishes default values for profile and acceptance criteria data such that partial matches can be determined with partially specified user profile and acceptance criteria data.

Another additional feature is to let a user aggregate several mailing lists together into one "virtual list" for her. She is offered the option of combining two or more subscriptions into one "meta-subscription" that appears as one mailing list in her email box. An example: she wants to combine a "theater" subscription and a "singers" subscription into one meta-subscription she calls "my-arts". Incoming messages to her are then addressed to that list name. When she sends out a message, the underlying mailing lists become message acceptance criteria data which she can check on or off individually to indicate which lists her message should go to. Additionally, for each list she selects, she also needs to specify message acceptance criteria data within that list as per the prior discussion.

Optionally, when a message goes to several lists, recipients belonging to more than one of those lists will orally receive one message (as happens today with newsgroup "cross-postings").

Another additional feature is to allow the user the option of receiving messages for a subscription on the service provider's web site, rather than in her email inbox. In this case the system keeps track of which messages she has and hasn't read, and provides a means of reading and replying to messages.

Another additional feature is to allow users to create ballots to collect votes on any subject from users they are matched to. A user describes the ballot questions via a web site user interface, and the system creates a poll and emails it out to the matched users on the mailing list. The results of the poll are tallied and available for viewing on the service provider's web site. Another additional feature is to provide the user the option of a digest version of messages from a subscription. Rather than each message being delivered separately, a digest message containing multiple messages collected over a short period of time is sent out periodically. Each user specifies when to send out a digest to them, based on time, number of messages waiting, etc. The system collects messages and periodically delivers the digest to the user.

Another additional feature is to provide inexact matching, letting users set thresholds and instructions for different levels of matching. Rather than the previously described 100% match, this allows for partial matching. The user can specify different actions, e.g., they might want scores of 100% delivered via email, those from 70–99% delivered via a daily digest summary email, and those from 60–69% delivered weekly via digest summary email. Scoring the extent of the match also provides the user the ability to literally "turn the volume up or down" on a subscription as a whole. He simply controls a single parameter specifying the threshold for messages to get through.

A related additional feature is to provide the user with a way of expressing the volume of email he desires, and then adjust automatically the score threshold to approximate that volume of traffic. Likewise, the user and/or service provider might want to limit the size of messages (avoiding binaries, pictures, etc.).

Another additional feature is to use more advanced ways of matching acceptance criteria data to user profile data, such as fuzzy logic, artificial intelligence techniques such as discrimination nets, etc. These are techniques well known to those skilled in the art, and can readily be applied within the scope of the present invention.

Another additional feature is a billing mechanism wherein certain "high value" lists are accessible for a fee based on a variety of pricing models, such as monthly charge, volume of messages sent or received, etc. Additional tables would store information to aid in tracking these changes. The billing mechanism would periodically process the information to generate bills for users.

Another additional feature is allowing subscribers to have references within their acceptance criteria data to other subscribers' acceptance criteria data. This is a way for subscribers to use each other's acceptance criteria data. There are many uses for combining acceptance criteria data, with some "real world" parallels. For instance, when musicians form a band, it is often through a process of beginning with each individual's acceptance criteria data, testing whether there is common acceptance criteria data that makes sense, and then finally combining their acceptance criteria data.

In the example below, three subscribers B, C, and D are in different locations and are of different ages. They have met in a "travel" dynamically matched mailing list, and decide to form a discussion niche within the list. The subscribers add references to each other's acceptance criteria data to the records. Their relevant user profile data and acceptance criteria data are:

| Subscriber | Location (profile) | Acceptance criteria data for others' locations | Age (profile) | Age Criteria | Other Criteria Records |
|---|---|---|---|---|---|
| B | Brazil | California or Denmark or Brazil | 20 | 23–33 | C, D |
| C | California | California or Denmark or Brazil or Germany or New York | 26 | 20–30 | B, D |
| D | Denmark | California or Denmark or Brazil or Venezuela | 23 | 20–27 | B, C |
| Resulting "Outsider" Acceptance criteria data | N/A | California, Brazil, or Denmark | N/A | 23–27 | N/A |

Each subscriber has previously specified location acceptance criteria data and age acceptance criteria data that match the other two subscribers. To form a group, these three subscribers specify to the system to use each other's acceptance criteria data.

Before doing this, the subscribers B, C, and D would each be matched with some other subscribers on the mailing list, which the other members of B–C–D weren't matched with. By incorporating each others' acceptance criteria data they all exclude those other subscribers who do not meet all three sets of acceptance criteria data. A subscriber acceptance criteria data are never used on that subscriber. Since that subscriber's acceptance criteria data are his acceptance criteria data for others and not for himself, it is not applied to him. Referring to our previous example, subscriber B is 20 years old, but his acceptance criteria data for others is age 20–33, which doesn't include him. Thus when a second subscriber uses a first subscriber's acceptance criteria data, in the preferred embodiment he does not apply that acceptance criteria data to the first subscriber when determining interaction participants. Also in thy preferred embodiment, referenced acceptance criteria data are referring to the combination of a subscriber's user profile acceptance criteria data and message profile acceptance criteria data. Alternatively, the two types of acceptance criteria data could be referenced and used separately between users.

When B combines C's and D's acceptance criteria data with his own, the resulting acceptance criteria data an "outsider" then has to meet is the intersection: California or Denmark or Brazil, and age range 23–30. The combined outsider acceptance criteria data has a modified age range of 23–27. Thus when determining a subscribers' recipient list for a message, outsiders from this group would have to match all of B, C, and D's acceptance criteria data in order to exchange email with any of them. If a fourth "outsider" subscriber "E" from Denmark, age 30, looks for interaction matches in the subscriber list, B, C, and D will not match because of their references to each others' acceptance criteria data. Since D's age acceptance criteria data excludes E, E doesn't match any of them.

An acceptance criterion reference to another users acceptance criteria data can be thought of as a container. Each acceptance criterion inside the referenced user's acceptance criteria data set must be checked. Thus, the system would perform the entire acceptance criteria data process to compare the new set of acceptance criteria data against the given data set. The system must allow for the possibility of circular references to avoid an "endless loop"; techniques for handling this are well known to those skilled in the art.

Since any one user's changes to his criteria impact everyone in the group, the system would include at least two types of groups: "democratic" and "dictatorial". In a democratic group, the system notifies users of any proposed criteria changes, and users have the opportunity to discuss and vote be changes go into effect. In a dictatorial group, one or more of the users are in charge, and approve all criteria changes through a mechanism provided by the system.

There are many other features of electronic mailing list systems such as Majordomo, Listserv, and eGroups.com that are well known to those skilled in the art, that have obvious additional features for the present invention.

Description—Alternative Embodiments for the Present Invention

As discussed earlier, there are many alternative embodiments of the present invention. People need personalized, tunable communities. They need the ability to specify and match up with other people in a variety of electronic forums. This invention is a very powerful way of allowing them to do that—to see only the people they're matched to see. It's like going to a party with all the right people.

One major Difference between different kinds of forums is the latency of the transmissions between parties. Whereas a forum like email has a high latency, a forum such as chat has continuous transmission between the parties, or low latency.

One alternative embodiment is voicemail. Voicemail is very similar to electronic mail in that users typically have a mailbox, and there are group distribution lists, like electronic mailing lists for email. Interaction is non-realtime: each user uses voicemail without any real-time, direct interaction. Thus voicemail, being so similar to email, is a direct application of the present invention to that medium. The user may access the service visually (e.g., web) or orally (e.g., telephone).

Another alternative embodiment for the present invention is unified messaging. Unified messaging is a medium that combines email, voicemail, fax, and potentially other communication services and lets each user select their medium of choice. Sun, Lucent and a number of other companies develop unified messaging solutions. Since unified messaging can always get from other mediums to email, unified messaging is a direct application of the present invention to that medium. These are just different mediums for communication, but they aren't materially different for our purposes. In the preferred embodiment all setup, control, and access to subscriptions, shard data, etc, happens via the web. One modification to that for this alternative is to allow that setup, control, and access to happen via email (or email translated to other unified messaging mediums) instead of the web.

A natural extension to unified messaging is to include telephone, pager, and instant messaging communication, as additional mediums of communication. A user may use different forms of unified messaging for different subscriptions. For instance, a user may want to receive casual neighborhood discussion via email, but receive emergency messages from any neighbor within 5 blocks via text pager, and any communication (e.g., "can I borrow a cup of sugar?") within one block of them, via both instant messaging and fax.

Figure 12:
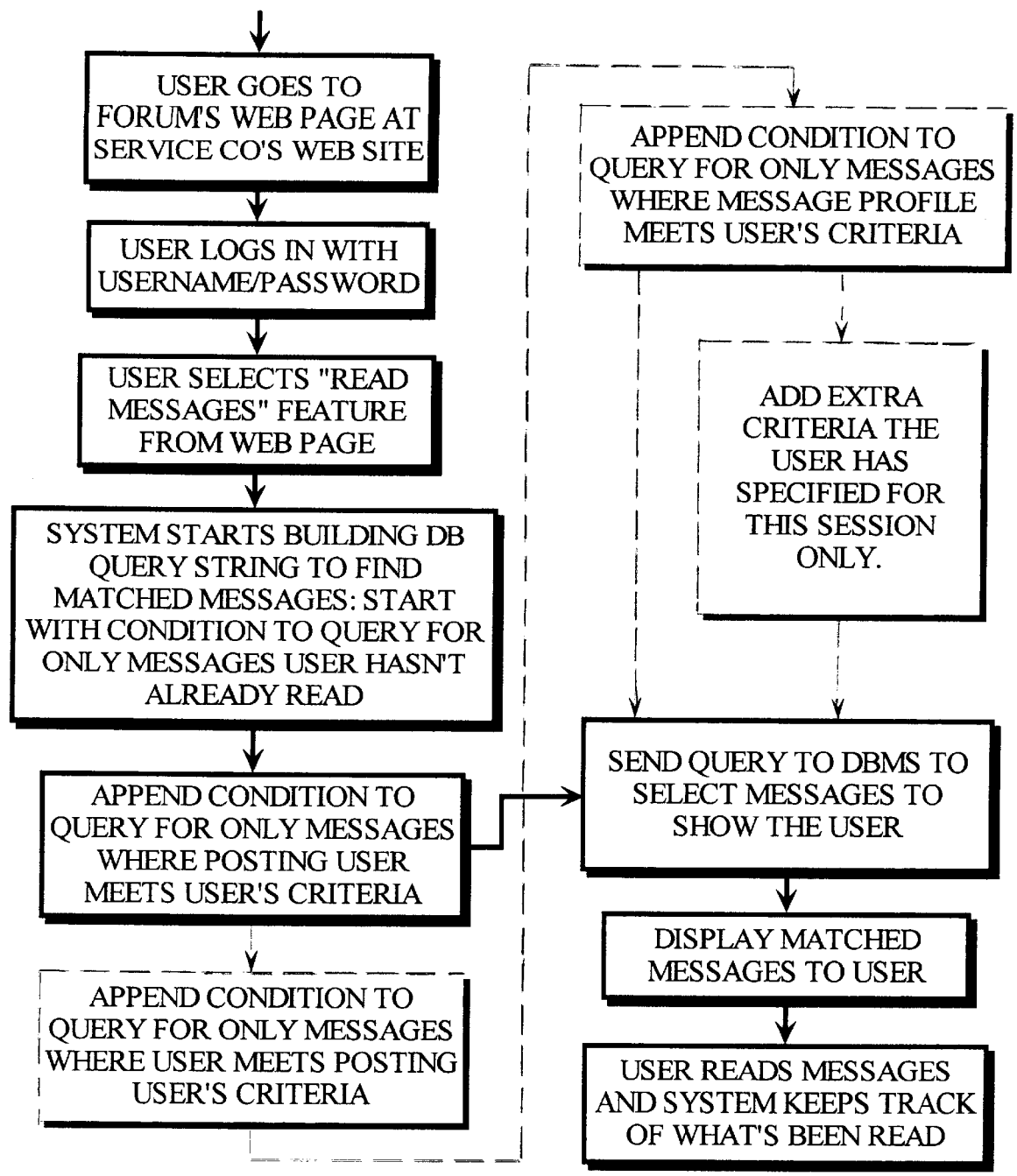
FIG. 12 is a flowchart of an alternative embodiment in which the user reads messages in a web-based discussion forum.

Another alternative embodiment for the present invention is web-based discussion boards. FIG. 12 is la diagram detailing a process for this alternative. Web-based discussion boards are very similar to mailing lists, but users receive and reply to messages (and possibly send messages) through web site rather than an email client application. In other words, rather than messages flowing in and out of the user's email-box, there is instead a bulletin board metaphor with a web interface. The subscription process is substantially the same. The system then keeps track of which messages each user has and hasn't read. The message boards section of the Motley Fool web site (www.fool.com) (Dec. 1998) are an example in the prior art of a web-based discussion board, without benefit of the present invention.

Another alternative embodiment for the present invention is electronic bulletin boards. The most common electronic bulletin boards on the internet are USENET newsgroups (hereafter referred to as newsgroups). The subscription process in this alternative is substantially the same; the main differences come in reading and posting messages. Subscribers post messages through the service provider's server. This could be through a newsgroup server port, or using a web interface, via email to the service provider, etc. Since newsgroup postings are replicated on servers throughout the Internet, there is some efficiency to be gained by encoding some of the database information about the posting user in headers of the posted message. This allows client newsgroup reading programs to do some decoding and matching without having to interact with the service provider's server. Examples of message headers are: "X-Posting-Type: Dynamically Matched Posting", "X-Local2Me-User: $joe_{13}hotmail$". The system may also encode insensitive profile and acceptance criteria data from the posting user in message headers. Let's call this full set of headers "Dynamic Matching™ Headers." (An example of insensitive user profile data is whether the subscriber considers himself to be a "professional" or "amateur" in a given field. A home address is an example of sensitive user profile data that, if needed, will have to be evaluated privately at the service provider's server during a user's news reading session.) The client newsgroup reading application may use the Dynamic Matching™ Headers for matching or may require subscribers to read messages through some method provided by a service provider that is utilizing the present invention. In the latter case the client newsgroup reading software knows how to exchange with the server the extra information needed to support the present invention. It informs the server of the identity of the user who is reading messages. The server then only transmits messages whose users form a match and optionally a message acceptance criteria data match with the reading user. Alternatively, the newsgroup reading software may allow the user to see all postings, but highlight matching ones using color, icons, etc. The server in this case transmits additional information to the news reading software about which individual posted messages should have this special highlighting.

If the client newsgroup reading software knows how to interpret Dynamic Matching™ Headers, it may choose to do the matching itself, which may be more efficient than accessing the server for determining match status for each message.

Another alternative embodiment for the present invention is online gaming rendezvous. Services such as "Yahoo! Games" (December 1998) offer forums in which users can meet up for games of cards and other internet-based multi-player online games. Indeed nearly all commercial computer games to day have some multi-player internet features built in. The typical online gaming forum divides the users into skill levels (their main acceptance criterion) and the users then have to rendezvous via chat to start a game, or jump into an already-formed game. A common experience is to quit part way through a game when you find that your gaming companions are a bad match, in conversation style, speed of play, etc. Applying the present invention, the service provider would offer a host of user profile acceptance criteria data and user profile data to help users rendezvous with the best partners. There is still a registration process for collecting base user profile data. The subscription process is more transient, being more of a "gaming preferences" setup. Following the setup, the user is presented with a set of players who match up with the user based on a mutual acceptance criteria data match. They can then chat, send each other instant messages to invite each other to play, etc. Optionally, when messages are sent they may include, message profile data to allow matched users to apply their message acceptance criteria data. An alternative is to show the user all other users, but denote the matching users through an icon or other graphic highlighting. The system also shows the browsing user games in progress that have open slots, highlighting the users within those games matched to the browsing user. He can then join a game that will have the best chance of being satisfying to him.

Another alternative embodiment for the present invention is online gaming. Many users can play the game simultaneously, but each user only interacts with other users they are mutually matched to. The age software is designed to allow for game play in which each user sees only the other players he is matched to see. This is very similar in implementation to online gaming rendezvous, with additional functionality built into the game play to account for this customized per-player environment.

Another alternative embodiment for the present invention is instant messaging. Instant messaging services such as ICQ, "Yahoo! Pager", AOL Instant Messenger, and Excite PAL allow a user to send another user an immediate text message that pops up on the other user's screen while the user is connected to the messaging system. This is typically when they are connected to the internet and running the messaging client application. Instant messaging applications do not as of yet have the equivalent of electronic mailing lists, i.e., a way to send an instant message to a group of users. Applying the present invention to instant messaging requires no change to the subscription. An additional user interface component in the instant messaging software or on a web page allows the user to see a list of all matching users who are logged on. This happens within the context of a subscription to a particular forum. The user may then choose to send a message to any one user on that list. Sending of messages to an entire matching group is routed through the service provider's instant messaging server, which determines which message recipients will receive the message. It then distributes the message to those recipients. As an example of its use, a user may have two subscriptions set up—she wants to hear from all neighbors within five blocks from her about for sale items, and all neighbors within one block of her about emergencies.

Another alternative embodiment for the present invention is online chat. The subscription process is modified in a way similar to online gaming rendezvous. In today's online chat, users begin by selecting a chat room, and then chatting with everyone in that forum. There is typically a way to ignore specified users. The present invention allows a first user to set up more elaborate acceptance criteria da a only interacting with other users who form a one-way or two-way match with the first user. In the case of a one-way match, the match calculation is between the first user's acceptance criteria data and each other user's user profile data. Alternatively, it allows full chat exchange with all users, but indicates in the user list & message window the degree of match the user has with each other user. For instance, the system could display stronger matches in darker colors and weaker matches in lighter colors. Subscription settings may apply to one or more chat rooms. After setting up a subscription, the user can view a list of chat rooms and see what rooms the people he's matched with are spending their time in. He can then select a room and begin interacting. The message profile and acceptance criteria data are not used. Alternatively, the message profile and acceptance criteria data are used to help users communicate about specific subjects. In that case the system queries the user for message profile data if it cannot be determined automatically.

Another alternative embodiment for the present invention is video conferencing. This is similar to online chat and online gaming rendezvous. The invention is used for finding good videoconferencing partners within a given forum, by either highlighting matching users or only showing matching users. The present invention can be used with either one on one video conferencing, or with group video conferencing. In a group setting, each user conferences with many matching users at once, limited only by the limitations of number of simultaneous user connections in the video conferencing system. Message profiles and message profile acceptance criteria data are not used.

Another alternative embodiment for the present invention is audio conferencing, or "party line." This is an obvious extension of online chat, and similar to video conferencing, wherein multiple users have an audio-only real-time connection to each other in a group setting. This is implemented in substantially the same manner as video conferencing.

Another alterative embodiment for the present invention is online clubs and communities, such as "Yahoo! Clubs"

(Dec. 1998). In these services, a group forms around a theme, and users can chat, post messages to a discussion board, share web links of interest, etc., within that group. By using the present invention, the user can create a personal, tunable niche within the group. The subscription process is the same: after selecting a club, a user can specify his acceptance criteria data within the club. The user then only sees content (chat, message postings, web links, pictures, calendar entries, etc.) of other users who form a match with the user. The chat portion is handled as discussed in the online chat application above. Message postings are handled as described in web-based discussion boards above. Other areas are handled in a similar fashion. Alternatively, the system may allow for one-way acceptance criteria data application: the first user sees content from second users who the first user's acceptance criteria data matches, without regard to the second users' acceptance criteria data. Another alternative process is for to allow moderators, club owners, and other "authorities" to view all messages, even if ere is no mutual acceptance criteria data match.

Another alternative embodiment is web surfing community forums. These forums provide a means for users to exchange messages with each other based on the web sites they are viewing. This service can be provided independently of the web sites that users are posting messages to. This is done through web browser plug-ins and other new technology that allow the exchanged messages to be stored somewhere other than the currently-viewed web site. When users are browsing that site or a particular page at that site, the messages are retrieved from the independent data store and displayed to the user.

In this embodiment, the message exchange may happen in real-time (e.g., chat) or time-shifted (e.g., posting messages). For example, users at a site such as CNN.com could communicate with other users who are on that site at the same time, or who come to the site at other times. The present invention is modified to use the web site address (e.g., www.local2me.com) the user is viewing to match the user with other users. Alternatively it could use the address of a specific page being viewed within the web site (e.g., www.local2me.com/community/internet.html).

For real-time exchange in this embodiment, the web site or page the user is viewing is user profile data. Users can set as part of their user profile acceptance criteria data one or many web pages or web sites. As an example, a user at CNN.com's user profile data would include CNN.com as his currently viewed web site (or alternatively a page within the site). His user profile acceptance criteria data could include all users at CNN.com, ABCsports.com, MSNBC.com, and PBS.org. For time-shifted message exchange, the web site or page the user is vie wing when he posts a message is stored as part of the message profile data (not the user profile data). Other users can set as part of their message profile acceptance criteria data one or many web pages or sites.

An example: a user X goes to eBay.com online auction site and posts a message on its web home page using the present invention. and then leaves the web site. A user Y goes to eBay.com and sees user X's message if X's user profile data meets Y's acceptance criteria data and if user Y's message criteria data matches to user X's posted message's message profile data. Alternatively, a two-way match process is used. User Y sees user X's message if X and Y form a two-way match of user profile data to acceptance criteria data and if user Y's message profile criteria data matches to user X's posted message's message profile data.

In another alternative, user Y may see all messages, with an indication associated with each message about the degree of match between Y and the user who posted the message. Or the user may be provided a threshold control for selecting the minimum match score of messages to be displayed.

To summarize the web surfing community forums embodiment, let's take an example. A single forum, called "web surfers," is created by Local2Me.com to dynamically match web surfers from all over the world as they are surfing web sites. It allows users to chat with each other in a group forum when they are on the same web site. A user John joins the web surfers forum through the Local2Me.com web site. He sets his user profile as a 23 year old single male, living in New York City. He sets his user profile acceptance criteria data to match men and women between ages of 18–28, within 100 miles of him. A separate window for chatting opens next to his main browser window. John now begins surfing the web in his main browser window, and as he enters each web site, the chatting window updates to show him the users also browsing that web site that he's matched to. John can now exchange messages with users as he surfs the web.

Clearly, in the burgeoning online communications arena there will be other electronic forums that can apply the present invention to great avail.

CONCLUSION, RAMIFICATIONS, AND SCOPE OF INVENTION

Thus the reader will see that the present invention, Dynamically Matching Users for Group Communication, provides a process by which individuals of all ages and profiles may locate very high quality, personalized matched groups of people for highly satisfying affinity group communications and community.

While my above description contains many specificities, these should not be construed as limitations on the scope of the invention, but rather as an exemplification of one preferred embodiment thereof. Many other variations are possible. Several examples, including newsgroups, online chat, web discussion boards, and instant messaging have been explored in the alternative embodiments section above.

Accordingly the scope of the invention should be determined not by the embodiment(s) illustrated, but by the appended claims and their legal equivalents.

What is claimed is:

1. A method of dynamically matching defined users of a group communication system, so that subgroups of the users having certain characteristics can intercommunicate comprising the steps of:

a) establishing acceptance criteria parameters and user profile data parameters defining said characteristics;

b) obtaining acceptance criteria data and user profile data corresponding to the acceptance criteria parameters and user profile data parameters for each user of a multiplicity of users;

c) calculating the degree of match between the user profile data of each user and the acceptance criteria data of all other users of said multiplicity of users, and using the results of those calculations that exceed a particular threshold level of match to identify a subgroup associated with each said user; and d) upon receipt by the system of a communication from a particular one of said users including message data and user identity data, making said message data available to all other members of the subgroup associated with said particular one of said users.

2. A method of dynamically matching defined users of a group communication system, so that subgroups of the users having certain characteristics can intercommunicate, comprising the steps of:

a) establishing acceptance criteria parameters and user profile data parameters defining said characteristics;

b) obtaining acceptance criteria data and user profile data corresponding to the acceptance criteria, parameters and user profile data parameters for each user of a multiplicity of users;

c) calculating the degree of match between the user profile data of each user and the acceptance criteria data of all other users of said multiplicity of users, and using the results of those calculations to identify a subgroup associated with each said user based on the degree of match having a particular relationship to a level of match threshold defined for all other users of said multiplicity of users; and d) upon receipt by the system of a communication from a particular one of said users including message data and user identity data, said system makes said message data available to all members of the subgroup associated with said particular one of said users.

3. A method of dynamically matching defined users of a group communication system, so that subgroups of the users having certain characteristics can intercommunicate, comprising the steps of:

a) establishing acceptance criteria parameters and user profile data parameters defining said characteristics b) obtaining acceptance criteria data and user profile data corresponding to the acceptance criteria parameters and user profile data parameters for each user of a multiplicity of users;

c) receiving a communication from a particular one of said multiplicity of users including message data and user identity data;

d) calculating the degree of match between the user profile data of said particular one user and the acceptance criteria data of each other user of said multiplicity of users, and using the results of those calculations, which have a particular relationship to a specific level of match threshold, to identify a subgroup associated with said particular one user; and e) making said message data available to all members of said subgroup.

4. A method of dynamically matching defined users of a group communication system, so that subgroups of the users having certain characteristics can intercommunicate, comprising the steps of:

a) establishing acceptance criteria parameters and user profile data parameters defining said characteristics, b) obtaining acceptance criteria data and user profile data corresponding to the acceptance criteria parameters and user profile data parameters for each user of a multiplicity of users;

c) receiving a communication from a particular one of said multiplicity of users including message data and user identity data;

d) calculating the degree of match between the user profile data of said particular one user and the acceptance criteria data of each other user of said multiplicity of users, and using the results of those calculations to identify a subgroup associated with said particular one user based on the degree of match having a particular relationship to a level of match threshold defined for each user of said multiplicity of users; and e) making said message data available to all members of said subgroup.

5. A method of dynamically matching defined and unknown users of a group communication system, so that subgroups of the users having certain characteristics can intercommunicate, comprising the steps of:

a) establishing acceptance criteria parameters and user profile data parameters defining said characteristics;

b) obtaining, acceptance criteria data corresponding to the acceptance criteria parameters for each user of a multiplicity of users;

c) receiving a communication from an unknown user including message data and user profile data;

d) calculating the degree of match between the user profile data of said unknown user and the acceptance criteria data of each user of said multiplicity of users, and using the results of those calculations; which have a particular relationship to a specific level of matching threshold, to identify a subgroup associated with said unknown user; and e) making said message data available to all members of said subgroup.

6. A method of dynamically matching defined and unknown users of a group communication system, so that subgroups of the users having certain characteristics can intercommunicate comprising the steps of:

a) establishing acceptance criteria parameters and user profile data parameters defining said characteristics;

b) obtaining acceptance criteria data corresponding to the acceptance criteria parameters for each user of a multiplicity of users;

c) receiving a communication from an unknown user including message data and user profile data;

d) calculating the degree of match between the user profile data of said unknown user and the acceptance criteria data of each user of said multiplicity of users, and using the results of those calculations to identify a subgroup associated with said unknown user based on the degree of match having a particular relationship to a level of match threshold defined for each user of said multiplicity of users; and e) making said message data available to all members of said subgroup.

7. A method of dynamically matching defined and unknown users of a group communication system, so that subgroups of the users having certain characteristics can intercommunicate, comprising the steps of:

a) establishing acceptance criteria parameters and user profile data parameters defining said characteristics;

b) receiving a communication from an unknown user including message data and user profile data;

c) obtaining acceptance criteria data corresponding to the acceptance criteria parameters for each user of a multiplicity of users;

d) calculating the degree of match between the user profile data of said unknown user and the acceptance criteria data of each user of said multiplicity of users, and using the results of those calculations, which have a particular relationship to a specific level of match threshold, to identify a subgroup associated with said unknown user; and e) making said message data available to all members of said subgroup.

8. A method of dynamically matching defined and unknown users of a group communication system, so that subgroups of the users having certain characteristics can intercommunicate comprising the steps of:

a) establishing acceptance criteria parameters and user profile data parameters defining said characteristics.

b) receiving a communication from an unknown user including message data and user profile data;

c) obtaining acceptance criteria data corresponding to the acceptance criteria parameters for each of a multiplicity of users;

d) calculating the degree of match between the user profile said unknown user and the acceptance criteria data of each user of said multiplicity of users, and using the results of those calculations to identify a subgroup associated with said unknown user based on the degree of match having a particular relationship to a level of match threshold defined for each user of said multiplicity of users; and e) making said message data available to all members of said subgroup.

9. A method of dynamically matching defined users of a group communication system, so that subgroups of the users having certain characteristics can intercommunicate comprising the steps of:

a) establishing acceptance criteria parameters and user profile data parameters defining said characteristics;

b) obtaining user profile data corresponding to the user profile data parameters for each user of a multiplicity of profiled users;

c) receiving a communication from a particular one of said multiplicity of profiled users including message data and user identity;

d) obtaining acceptance criteria data corresponding to the acceptance criteria parameters for each of a multiplicity of other users who may or may not be profiled users;

e) calculating the degree of match between the user profile data of said particular one user and the acceptance criteria data of said multiplicity of other users, and using the results of those calculations, which have a particular relationship to a specific level of match threshold, to identify a subgroup associated with said particular one user; and f) making said message data available to all members of said subgroup.

10. A method of dynamically matching defined users of a group communication system, so that subgroups of the users having certain characteristics can intercommunicate, comprising the steps of:

a) establishing acceptance criteria parameters and user profile data parameters defining said characteristics, b) obtaining user profile data corresponding to the user profile data parameters for each user of a multiplicity of profiled users;

c) receiving a communication from a particular one of said multiplicity of profiled users including message data and user identity data;

d) obtaining acceptance criteria data corresponding to the acceptance criteria parameters for each user of a multiplicity of other users who may or may not be profiled users;

e) calculating the degree of match between the user profile data of said particular one user and the acceptance criteria data of each user of said multiplicity of other users, and using the results of those calculations to identify a subgroup associated with said particular one user based on the degree of match having a particular relationship to a level of match threshold defined for each user of said multiplicity of other users; and f) making said message data available to all members of said subgroup.

11. A method of dynamically matching defined users of a group communication system, so that subgroups of the users having certain characteristics can intercommunicate, as recited in any one of claims 1, 2, 3, and 4 wherein in step b) acceptance criteria data and user profile data are obtained by extracting information from sources other than directly from the users.

12. A method of dynamically matching defined and unknown users of a group communication system, so that subgroups of the users having certain characteristics can intercommunicate, recited in any one of claims 5, 6, 7, and 8 wherein in said obtaining step acceptance criteria data is obtained by extracting information from sources other than directly from the users.

13. A method of dynamically matching defined users of a group communication system, so that subgroups of the users having certain characteristics can intercommunicate, as recited in any one of claims 9 and 10 wherein in step d) acceptance criteria data is obtained by extracting information from sources other than directly from the users.

14. A method of dynamically matching defined users of a group communication system, so that subgroups of the users having certain characteristics can intercommunicate as recited in any one of claims 9 and 10 wherein in step b) user profile data is obtained by extracting information from sources other than directly from the users.

15. A method of dynamically matching defined users of a group communication system, so that subgroups of the users having certain characteristics can intercommunicate, as recited in any one of claims 3 and 4 wherein in step d) the degree of match between the acceptance criteria data of said particular one user and the user profile data of each other user of said multiplicity of users is also included in the calculation of the degree of match.

16. A method of dynamically matching defined and unknown users of a group communication system, so that subgroups of the users having certain characteristics can intercommunicate, as recited in any one of claims 5, 6, 7, and 8 and further comprising the step of:

before said calculating step, obtaining user profile data corresponding to user profile data parameters for each user of said multiplicity of users;

wherein the communication received from said unknown user in said receiving step additionally includes acceptance criteria data; and wherein in said calculating step the degree of match between acceptance criteria data of said unknown user and user profile data of each user of said multiplicity of users is also included in the calculation of the degree of match.

17. A method of dynamically matching defined users of a group communication system, so that subgroups of the users having certain characteristics can intercommunicate as recited in any one of claims 1 and 2 wherein in step c) the degree of match between acceptance criteria data of each said user to user profile data of all other users of said multiplicity of users is also included in the calculation of the degree of match.

18. A method of dynamically matching defined users of a group communication system, so that subgroups of the users having certain characteristics can intercommunicate, as recited in any one of claims 9 and 10 and further comprising the steps of:

before said calculating step, collecting user profile data corresponding to user profile data parameters or ones of said multiplicity of other users for whom user profile data is not known; and collecting acceptance criteria data corresponding to acceptance criteria data parameters for said particular one user;

wherein in step e) the degree of match between the collected acceptance criteria data and the user profile data of said multiplicity of other users who are profiled users is also included in the calculation of the degree of match, and the degree of matches between the collected acceptance criteria data and the collected user profile data is also included in the calculation of the degree of match.

19. A method of dynamically matching defined users of a group communication system, so that subgroups of the users having certain characteristics can intercommunicate, recited in any one of claims 9 and 10 and further comprising the step of:

before said calculating step, collecting user profile data corresponding to user profile data parameters for ones of said multiplicity of other users for whom user profile data is not known;

wherein in step c) additionally receiving acceptance criteria data corresponding to the acceptance criteria data parameters for said particular one;

wherein in step e) the degree of match between the acceptance criteria data of said particular one and the user profile data of said multiplicity of other users who are profiled users is also included in the calculation of the degree of matches, and the degree of match between the acceptance criteria data of said particular one and the collected user profile data is also included in the calculation of the degree of matches.

20. A method as recited in any one of claims 1–8 and further comprising the steps of:

associating a unique message identifier with said message data;

associating said subgroup with said unique message identifier;

receiving a reply communication from one user of said subgroup including reply message data, reply user identity data, and said unique message identifier; and making said reply message data available to said subgroup.

21. A method of dynamically matching defined users of a group communication system, so that subgroups of the users having certain characteristics can intercommunicate, as recited in claim 2 wherein in step d) an indication of degree of match to each member of said subgroup is also made available to all members of the subgroup associated with said particular one of said users.

22. A method as recited in any one of claim 4, 6, 8, and 10 wherein in sad making step an indication of degree of match to each member of said subgroup is also made available to all members of said subgroup.

* * * * *